(12) United States Patent
Alvares et al.

(10) Patent No.: US 10,824,682 B2
(45) Date of Patent: Nov. 3, 2020

(54) ENHANCED ONLINE USER-INTERACTION TRACKING AND DOCUMENT RENDITION

(71) Applicant: ResearchGate GmbH, Berlin (DE)

(72) Inventors: Darren Alvares, Berlin (DE); Niall Kelly, Berlin (DE); Vyacheslav Zholudev, Berlin (DE); Axel Tölke, Berlin (DE); Mark Howard-Banks, Berlin (DE); Stephen Mansfield, Berlin (DE); Steffen Irrgang, Berlin (DE)

(73) Assignee: ResearchGate GmbH, Berlin (DE)

( * ) Notice: Subject to any disclaimer, the term of this patent is extended or adjusted under 35 U.S.C. 154(b) by 0 days.

(21) Appl. No.: 16/146,545

(22) Filed: Sep. 28, 2018

(65) Prior Publication Data
US 2019/0034424 A1   Jan. 31, 2019

Related U.S. Application Data

(63) Continuation of application No. 15/682,236, filed on Aug. 21, 2017, which is a continuation of application No. 15/158,989, filed on May 19, 2016, now Pat. No. 9,753,922.

(60) Provisional application No. 62/163,728, filed on May 19, 2015, provisional application No. 62/171,056, filed on Jun. 4, 2015.

(51) Int. Cl.
| G06F 15/173 | (2006.01) |
| G06F 16/93 | (2019.01) |
| G06F 16/9535 | (2019.01) |
| G06F 16/2457 | (2019.01) |
| G06Q 30/02 | (2012.01) |
| H04L 29/06 | (2006.01) |
| H04L 29/08 | (2006.01) |

(52) U.S. Cl.
CPC ........ *G06F 16/93* (2019.01); *G06F 16/24578* (2019.01); *G06F 16/9535* (2019.01); *G06Q 30/02* (2013.01); *H04L 67/02* (2013.01); *H04L 67/1044* (2013.01); *H04L 67/22* (2013.01); *H04L 67/42* (2013.01)

(58) Field of Classification Search
CPC ......... G06F 17/30011; G06F 17/30867; G06F 17/3053; H04L 67/02; H04L 67/1044; H04L 67/22; H04L 67/42; G06Q 30/02
See application file for complete search history.

(56) References Cited

U.S. PATENT DOCUMENTS

| 5,708,828 A | 1/1998 | Coleman |
| 5,806,078 A | 9/1998 | Hug et al. |
| 5,809,317 A | 9/1998 | Kogan et al. |

(Continued)

OTHER PUBLICATIONS

"U.S. Appl. No. 15/040,109, Notice of Allowance dated Jun. 13, 2018", 12 pgs.

(Continued)

*Primary Examiner* — Richard G Keehn
(74) *Attorney, Agent, or Firm* — Schwegman Lundberg & Woessner, P.A.

(57) ABSTRACT

Disclosed are systems and methods for enhanced tracking of user interactions with online documents, such as, in accordance with various embodiments, interaction tracking on a sub-document level of granularity and/or interaction tracking that involves storing one or more interaction parameters (e.g., an identifier of the document or of the interacting user) for each interaction.

20 Claims, 12 Drawing Sheets

(56) References Cited

U.S. PATENT DOCUMENTS

| | | |
|---|---|---|
| 6,289,342 B1 | 9/2001 | Lawrence et al. |
| 6,963,959 B2 | 11/2005 | Hsu et al. |
| 7,010,742 B1 | 3/2006 | Hsu et al. |
| 7,386,792 B1 | 6/2008 | Bascom et al. |
| 8,203,952 B2 | 6/2012 | Borkovsky et al. |
| 8,379,053 B1 * | 2/2013 | Phillips .................. G06Q 30/02 |
| | | 345/619 |
| 8,386,912 B2 | 2/2013 | Story et al. |
| 8,418,054 B2 | 4/2013 | Ikegami |
| 8,478,662 B1 | 7/2013 | Snodgrass et al. |
| 8,577,754 B1 | 11/2013 | Chanda et al. |
| 8,930,392 B1 | 1/2015 | Leichter |
| 8,930,818 B2 | 1/2015 | Cordasco |
| 9,438,694 B1 | 9/2016 | Ochesel et al. |
| 9,626,000 B2 | 4/2017 | Kurzweil et al. |
| 9,715,482 B1 * | 7/2017 | Bjorkegren ............. G06F 17/24 |
| 9,753,922 B2 | 9/2017 | Haeusler et al. |
| 9,858,349 B2 | 1/2018 | Zholudev et al. |
| 9,916,365 B1 | 3/2018 | Dick et al. |
| 9,996,629 B2 | 6/2018 | Zholudev et al. |
| 10,009,308 B2 * | 6/2018 | Brunn ..................... H04L 67/02 |
| 10,102,298 B2 | 10/2018 | Madisch et al. |
| 10,282,424 B2 | 5/2019 | Zholudev et al. |
| 10,387,520 B2 | 8/2019 | Zholudev et al. |
| 10,558,712 B2 | 2/2020 | Zholudev et al. |
| 10,650,059 B2 | 5/2020 | Häusler et al. |
| 2001/0051897 A1 | 12/2001 | Loeb et al. |
| 2002/0065848 A1 | 5/2002 | Walker et al. |
| 2003/0163416 A1 | 8/2003 | Kitajima |
| 2004/0044958 A1 | 3/2004 | Wolf et al. |
| 2004/0088504 A1 | 5/2004 | Hsu et al. |
| 2004/0111677 A1 | 6/2004 | Luken et al. |
| 2004/0148571 A1 | 7/2004 | Lue |
| 2005/0028143 A1 | 2/2005 | Aridor |
| 2005/0060287 A1 | 3/2005 | Hellman et al. |
| 2005/0080815 A1 | 4/2005 | Inoue et al. |
| 2006/0053364 A1 | 3/2006 | Hollander et al. |
| 2006/0112146 A1 | 5/2006 | Song et al. |
| 2006/0143558 A1 | 6/2006 | Albornoz et al. |
| 2006/0150079 A1 | 7/2006 | Albornoz et al. |
| 2006/0248063 A1 | 11/2006 | Gordon |
| 2006/0287971 A1 | 12/2006 | Armstrong |
| 2007/0136243 A1 | 6/2007 | Schorn |
| 2007/0143794 A1 | 6/2007 | Negi |
| 2007/0244867 A1 | 10/2007 | Malandain et al. |
| 2007/0255698 A1 | 11/2007 | Kaminaga et al. |
| 2008/0071803 A1 | 3/2008 | Boucher |
| 2008/0086680 A1 | 4/2008 | Beckman |
| 2008/0155390 A1 | 6/2008 | Karim et al. |
| 2008/0201320 A1 | 8/2008 | Hong et al. |
| 2008/0201348 A1 | 8/2008 | Edmonds et al. |
| 2008/0256143 A1 | 10/2008 | Reddy et al. |
| 2008/0270729 A1 | 10/2008 | Reddy et al. |
| 2009/0043824 A1 | 2/2009 | Claghorn |
| 2009/0234816 A1 | 9/2009 | Armstrong |
| 2010/0017850 A1 | 1/2010 | More et al. |
| 2010/0023854 A1 | 1/2010 | Song |
| 2010/0030752 A1 | 2/2010 | Goldentouch |
| 2010/0211432 A1 | 8/2010 | Yiu et al. |
| 2010/0278453 A1 | 11/2010 | King |
| 2011/0035805 A1 | 2/2011 | Barkan et al. |
| 2011/0099172 A1 | 4/2011 | Gaskill |
| 2011/0289105 A1 | 11/2011 | Hershowitz |
| 2011/0302162 A1 | 12/2011 | Xiao |
| 2011/0302166 A1 | 12/2011 | Moriya et al. |
| 2012/0022951 A1 | 1/2012 | Tolompoiko et al. |
| 2012/0059822 A1 | 3/2012 | Malandain et al. |
| 2012/0060082 A1 | 3/2012 | Edala et al. |
| 2012/0072854 A1 | 3/2012 | Zhou |
| 2012/0078612 A1 | 3/2012 | Kandekar et al. |
| 2012/0078937 A1 | 3/2012 | Hall |
| 2012/0095984 A1 | 4/2012 | Wren-hilton et al. |
| 2012/0109741 A1 | 5/2012 | Ballapragada et al. |
| 2012/0109945 A1 | 5/2012 | Lapko |
| 2012/0233152 A1 | 9/2012 | Vanderwende et al. |
| 2012/0284290 A1 | 11/2012 | Keebler et al. |
| 2013/0046571 A1 | 2/2013 | Tuchman et al. |
| 2013/0159110 A1 | 6/2013 | Rajaram et al. |
| 2013/0173687 A1 | 7/2013 | Tuchman et al. |
| 2013/0185198 A1 | 7/2013 | Lorch |
| 2013/0218634 A1 * | 8/2013 | Hills ...................... G06Q 30/02 |
| | | 705/7.29 |
| 2013/0246901 A1 | 9/2013 | Massand |
| 2013/0268405 A1 | 10/2013 | Yeh |
| 2013/0304906 A1 | 11/2013 | Yavilevich et al. |
| 2014/0006424 A1 | 1/2014 | Al-kofahi et al. |
| 2014/0075018 A1 | 3/2014 | Maycotte et al. |
| 2014/0143680 A1 | 5/2014 | Angarita et al. |
| 2014/0164352 A1 | 6/2014 | Denninghoff |
| 2014/0316930 A1 | 10/2014 | Jain et al. |
| 2014/0365319 A1 | 12/2014 | Huang et al. |
| 2015/0012449 A1 | 1/2015 | Jackson et al. |
| 2015/0039406 A1 | 2/2015 | Dubey et al. |
| 2015/0039686 A1 | 2/2015 | Chetlur et al. |
| 2015/0067037 A1 | 3/2015 | Ishihara |
| 2015/0154691 A1 | 6/2015 | Curry et al. |
| 2015/0248917 A1 | 9/2015 | Chang et al. |
| 2015/0262069 A1 * | 9/2015 | Gabriel ............. G06F 17/30867 |
| | | 706/48 |
| 2016/0080810 A1 | 3/2016 | Dutta et al. |
| 2016/0232143 A1 | 8/2016 | Fickenscher et al. |
| 2016/0232204 A1 | 8/2016 | Zholudev et al. |
| 2016/0239512 A1 | 8/2016 | Madisch et al. |
| 2016/0239579 A1 | 8/2016 | Zholudev et al. |
| 2016/0342591 A1 | 11/2016 | Zholudev et al. |
| 2016/0344828 A1 | 11/2016 | Hausler et al. |
| 2017/0147546 A1 | 5/2017 | Ishii et al. |
| 2017/0344541 A1 | 11/2017 | Haeusler et al. |
| 2018/0107755 A1 | 4/2018 | Zholudev et al. |
| 2018/0232367 A1 | 8/2018 | Häusler et al. |
| 2018/0239833 A1 | 8/2018 | Zholudev et al. |
| 2018/0246888 A1 | 8/2018 | Zholudev et al. |
| 2019/0213220 A1 | 7/2019 | Zholudev et al. |
| 2019/0213221 A1 | 7/2019 | Zholudev et al. |

OTHER PUBLICATIONS

"U.S. Appl. No. 15/040,109, Advisory Action dated Jul. 21, 2017", 2 pgs.

"U.S. Appl. No. 15/040,109, Examiner Interview Summary dated Mar. 13, 2018", 4 pgs.

"U.S. Appl. No. 15/040,109, Examiner Interview Summary dated Sep. 8, 2017", 4 pgs.

"U.S. Appl. No. 15/040,109, Examiner Interview Summary dated Sep. 22, 2016", 2 pgs.

"U.S. Appl. No. 15/040,109, Final Office Action dated Apr. 6, 2017", 9 pgs.

"U.S. Appl. No. 15/040,109, Final Office Action dated Nov. 2, 2017", 20 pgs.

"U.S. Appl. No. 15/040,109, First Action Interview—Pre-Interview Communication dated Sep. 23, 2016", 9 pgs.

"U.S. Appl. No. 15/040,109, Response filed Mar. 2, 2018 to Final Office Action dated Nov. 2, 2017", 10 pgs.

"U.S. Appl. No. 15/040,109, Response filed Jul. 6, 2017 to Non Final Office Action dated Apr. 6, 2017", 8 pgs.

"U.S. Appl. No. 15/040,109, Response filed Oct. 24, 2016 to Pre-Interview Communication", 4 pgs.

"U.S. Appl. No. 15/040,109, Supplemental Amendment filed Jun. 8, 2018", 6 pgs.

"U.S. Appl. No. 15/040,127, Final Office Action dated Jan. 30, 2017", 11 pgs.

"U.S. Appl. No. 15/040,127, Non Final Office Action dated Jun. 28, 2017", 13 pgs.

"U.S. Appl. No. 15/040,127, Non Final Office Action dated Aug. 11, 2016", 13 pgs.

"U.S. Appl. No. 15/040,127, Notice of Allowance dated Feb. 8, 2018", 9 pgs.

"U.S. Appl. No. 15/040,127, Response filed May 30, 2017 Final Office Action dated Jan. 30, 2017", 9 pgs.

(56) References Cited

OTHER PUBLICATIONS

"U.S. Appl. No. 15/040,127, Response filed Nov. 14, 2016 to Non Final Office Action dated Aug. 11, 2016", 10 pgs.
"U.S. Appl. No. 15/040,127, Response filed Nov. 28, 2017 to Non Final Office Action dated Jun. 28, 2017", 11 pgs.
"U.S. Appl. No. 15/040,133, Examiner Interview Summary dated Feb. 8, 2018", 3 pgs.
"U.S. Appl. No. 15/040,133, Examiner Interview Summary dated Apr. 6, 2017", 2 pgs.
"U.S. Appl. No. 15/040,133, Final Office Action dated Sep. 25, 2017", 11 pgs.
"U.S. Appl. No. 15/040,133, First Action Interview—Pre-Interview Communication dated Nov. 18, 2016", 4 pgs.
"U.S. Appl. No. 15/040,133, Non Final Office Action dated May 4, 2017", 10 pgs.
"U.S. Appl. No. 15/040,133, Non Final Office Action dated May 22, 2018", 11 pgs.
"U.S. Appl. No. 15/040,133, Response filed Jan. 25, 2018 to Final Office Action dated Sep. 25, 2017", 12 pgs.
"U.S. Appl. No. 15/040,133, Response filed Aug. 4, 2017 to Non Final Office Action dated May 4, 2017", 11 pgs.
"U.S. Appl. No. 15/040,133, Response filed Sep. 24, 2018 to Non Final Office Action dated May 22, 2018", 10 pgs.
"U.S. Appl. No. 15/040,133, Response filed Dec. 19, 2016 to Pre-Interview Communication dated Nov. 16, 2016", 4 pgs.
"U.S. Appl. No. 15/040,139, Examiner Interview Summary dated Mar. 6, 2017", 3 pgs.
"U.S. Appl. No. 15/040,139, Final Office Action dated Jun. 12, 2017", 23 pgs.
"U.S. Appl. No. 15/040,139, Non Final Office Action dated Nov. 18, 2016", 22 pgs.
"U.S. Appl. No. 15/040,139, Notice of Allowance dated Aug. 30, 2017", 7 pgs.
"U.S. Appl. No. 15/040,139, Response filed Feb. 21, 2017 to Non Final Office Action dated Nov. 18, 2016", 11 pgs.
"U.S. Appl. No. 15/040,139, Response filed Apr. 3, 2017 to Non Final Office Action dated Nov. 18, 2016", 13 pgs.
"U.S. Appl. No. 15/040,139, Response filed Aug. 14, 2017 to Final Office Action dated Jun. 12, 2017", 9 pgs.
"U.S. Appl. No. 15/158,989, First Action Interview—Office Action Summary dated Oct. 17, 2016", 15 pgs.
"U.S. Appl. No. 15/158,989, First Action Interview—Pre-Interview Communication dated Aug. 23, 2016", 14 pgs.
"U.S. Appl. No. 15/158,989, First Action Interview—Response filed Dec. 19, 2016 to Office Action Summary dated Oct. 17, 2016", 9 pgs.
"U.S. Appl. No. 15/158,989, Notice of Allowance dated Feb. 9, 2017", 9 pgs.
"U.S. Appl. No. 15/158,989, Notice of Allowance dated Jun. 9, 2017", 5 pgs.
"U.S. Appl. No. 15/158,989, Response filed Sep. 23, 2016 to Pre-Interview Communication", 4 pgs.
"U.S. Appl. No. 15/159,028, Examiner Interview Summary dated Aug. 28, 2018", 4 pgs.
"U.S. Appl. No. 15/159,028, Non Final Office Action dated Aug. 7, 2018", 16 pgs.
"U.S. Appl. No. 15/159,028, Response filed Sep. 28, 2018 to Non Final Office Action dated Aug. 7, 2018", 18 pgs.
"U.S. Appl. No. 15/847,152, Non Final Office Action dated Oct. 3, 2018", 21 pgs.
"European Application Serial No. 16154974.6, Communication Pursuant to Article 94(3) EPC dated Dec. 20, 2017", 9 pgs.
"European Application Serial No. 16154974.6, Extended European Search Report dated Jun. 17, 2016", 6 pgs.
"European Application Serial No. 16154974.6, Response filed Feb. 17, 2017 to Extended European Search Report dated Jun. 17, 2016", 9 pgs.
"European Application Serial No. 16154974.6, Response filed Apr. 30, 2018 to Communication Pursuant to Article 94(3) EPC dated Dec. 20, 2017", 14 pgs.
"European Application Serial No. 16154974.6, Summons to Attend Oral Proceedings dated Aug. 9, 2018", 8 pgs.
"European Application Serial No. 16170497.8, Communication pursuant to Article 94(3) EPC dated Jul. 8, 2017", 7 pgs.
"European Application Serial No. 16170497.8, Extended European Search Report dated Oct. 13, 2016", 10 pgs.
"European Application Serial No. 16170497.8, Response filed May 23, 2017 to Extended European Search Report dated Oct. 13, 2016", w/ English Translation, 18 pgs.
"European Application Serial No. 16170497.8, Response filed Dec. 18, 2017 to Communication pursuant to Article 94(3) EPC dated Jul. 8, 2017", 15 pgs.
"European Application Serial No. 16170497.8, Summons to Attend Oral Proceedings dated May 4, 2018", 8 pgs.
Bond, "How to create DVD-like Menus in MP4—MP4Menu", [Online]. Retrieved from the Internet: <https://forum.doom9.org/showthread.php?s=&threadid=66583>, (Dec. 11, 2003), 5 pgs.
Dejean, Herve, et al., "A System for Converting PDF Documents into Structured XML Format", ECCV 2016 Conference; [Lecture Notes in Computer Science; Lect. Notes Computer], Springer International Publishing, Cham, (Feb. 13, 2006), 129-140.
Huang, Jeff, et al., "No Clicks, No Problem: Using Cursor Movements to Understand and Improve Search", Human Factors in Computing Systems, ACM, 2 Penn Plaza, Suite 701, New York NY 10121-0701 USA, (May 7, 2011), 1225-1234.
Nayak, Amol, "MongoDB Cookbook", In: "MongoDB Cookbook", Packt Publishing, XP055299231, (Nov. 30, 2014), 106-110.
Tewari, Anand Shankar, et al., "Book recommendation system based on combine features of content based filtering, collaborative filtering and association rule mining", 2014 IEEE International Advance Computing Conference (IACC), IEEE, (Feb. 21, 2014), 500-503.
Wu, Lili, et al., "The Browsemaps: Collaborative Filtering at LinkedIn", Proceedings of the 6th Workshop on Recommender Systems and the Social Web (RSWeb 2014), Retrieved from the Internet:<URL:http://ceur-ws.org/Vol-1271/Paper3.pdf> [retrieved on Aug. 30, 2016], (Oct. 6, 2014), 8 pgs.
Zeni, et al., "A lightweight approach to semantic annotation of research papers", In Proceedings of the 12th international conference on Applications of Natural Language to Information Systems, Springer-Verlag, (2007), 61-72.
U.S. Appl. No. 15/950,010 U.S. Pat. No. 10,102,298, filed Feb. 10, 2016, Online Publication System and Method.
U.S. Appl. No. 15/040,127 U.S. Pat. No. 9,996,629, filed Feb. 10, 2016, Online Publication System and Method.
U.S. Appl. No. 15/040,133, filed Feb. 10, 2016, Online Publication System and Method.
U.S. Appl. No. 15/040,139 U.S. Pat. No. 9,858,349, filed Feb. 10, 2016, Online Publication System and Method.
U.S. Appl. No. 15/847,152, filed Dec. 19, 2017, Online Publication System and Method.
U.S. Appl. No. 15/958,856, filed Apr. 20, 2018, Online Publication System and Method.
U.S. Appl. No. 15/158,989 U.S. Pat. No. 9,753,922, filed May 19, 2016, Enhanced Online User-Interaction Tracking.
U.S. Appl. No. 15/682,236, filed Aug. 21, 2017, Enhanced Online User-Interaction Tracking.
U.S. Appl. No. 15/950,010, filed Apr. 10, 2018, Enhanced Online User-Interaction Tracking.
U.S. Appl. No. 15/965,666, filed Apr. 27, 2018, Enhanced Online User-Interaction Tracking and Document Rendition.
U.S. Appl. No. 15/195,028, filed May 19, 2016, Linking Documents Using Citations.
"U.S. Appl. No. 15/040,133, Examiner Interview dated Nov. 29, 2019", 3 pgs.
"U.S. Appl. No. 15/040,133, Final Office Action dated Jan. 11, 2019", 11 pgs.
"U.S. Appl. No. 15/159,028, Notice of Allowance dated Dec. 20, 2018", 19 pgs.
"U.S. Appl. No. 15/847,152, Examiner Interview Summary dated Mar. 7, 2019".
"U.S. Appl. No. 15/847,152, Response filed Mar. 1, 2019 to Non Final Office Action dated Oct. 3, 2018", 11 pgs.

(56) References Cited

OTHER PUBLICATIONS

"European Application Serial No. 16170497.8, Communication Regarding Oral Proceedings dated Dec. 6, 2018", 11 pgs.
"U.S. Appl. No. 15/040,133, Advisory Action dated May 15, 2019", 3 pgs.
"U.S. Appl. No. 15/040,133, Examiner Interview Summary dated Mar. 21, 2019", 3 pgs.
"U.S. Appl. No. 15/040,133, Response filed Apr. 11, 2019 to Final Office Action dated Jan. 11, 2019", 11 pgs.
"U.S. Appl. No. 15/682,236, Non Final Office Action dated Aug. 13, 2019", 10 pgs.
"U.S. Appl. No. 15/847,152, Notice of Allowance dated Apr. 5, 2019", 9 pgs.
"U.S. Appl. No. 15/950,010, Non Final Office Action Jun. 28, 2019", 14 pgs.
"U.S. Appl. No. 15/965,666, Non Final Office Action dated Jun. 12, 2019", 9 pgs.
"U.S. Appl. No. 15/965,666, Notice of Allowance dated Sep. 30, 2019", 9 pgs.
"U.S. Appl. No. 15/965,666, Response filed Sep. 12, 2019 to Non-Final Office Action dated Jun. 12, 2019", 6 pgs.
"European Application Serial No. 16154974.6, Response Filed May 13, 2019 to Summons to Attend Oral Proceedings dated Aug. 9, 2018", 10 pgs.
Phelps, et al., "Robust intra-document locations", Computer Networks, vol. 33, Issue 1-6,, (Jun. 2008), 105-118.
"U.S. Appl. No. 15/040,133, Appeal Brief filed Dec. 11, 2019", 11 pgs.
"U.S. Appl. No. 15/040,133, Notice of Allowance dated Mar. 20, 2020", 7 pgs.
"U.S. Appl. No. 15/682,236, Notice of Allowance dated Jan. 8, 2020", 9 pgs.
"U.S. Appl. No. 15/682,236, Response filed Dec. 12, 2019 to Non-Final Office Action dated Aug. 13, 2019", 7 pgs.
"U.S. Appl. No. 15/950,010, Examiner Interview Summary dated Apr. 8, 2020", 3 pgs.
"U.S. Appl. No. 15/950,010, Examiner Interview Summary dated Nov. 4, 2019", 3 pgs.
"U.S. Appl. No. 15/950,010, Final Office Action dated Feb. 5, 2020", 16 pgs.
"U.S. Appl. No. 15/950,010, Response filed Apr. 6, 2020 to Final Office Action dated Feb. 5, 2020", 11 pgs.
"U.S. Appl. No. 15/950,010, Response filed Oct. 28, 2019 to Non-Final Office Action dated Jun. 28, 2019", 9 pgs.
"U.S. Appl. No. 15/965,666, Corrected Notice of Allowability dated Dec. 4, 2019", 2 pgs.
"European Application Serial No. 16170497.8, Response filed Nov. 12, 2018 to Summons to Attend Oral Proceedings dated May 4, 2018", 38 pgs.
"U.S. Appl. No. 15/950,010, Advisory Action dated Apr. 17, 2020", 3 pgs.
"U.S. Appl. No. 15/950,010, Non-Final Office Action dated Apr. 28, 2020", 13 pgs.
"U.S. Appl. No. 15/958,856, Non-Final Office Action dated Jun. 1, 2020", 12 pgs.

* cited by examiner

ENHANCED ONLINE USER-INTERACTION TRACKING AND DOCUMENT RENDITION

CROSS-REFERENCE TO RELATED APPLICATIONS

This application is a continuation of U.S. patent application Ser. No. 15/682,236, filed on Aug. 21, 2017, which is a continuation of U.S. patent application Ser. No. 15/158,989, filed on May 19, 2016, which claims priority to and the benefit of U.S. Provisional Patent Application No. 62/163,728, filed on May 19, 2015, and U.S. Provisional Patent Application No. 62/171,056, filed on Jun. 4, 2015. The disclosures of all four priority applications are hereby incorporated herein by reference in their entireties.

BACKGROUND

With the rapid increase in Internet access and usage enjoyed by the general population in recent years, much publishing activity has shifted from traditional printed media to the Internet. Advantageously, online publishing is comparatively cheap, and provides a very large potential audience with access to the published content. In addition, it facilitates estimating the size of the actual audience and assessing how the published content is received by tracking website visitors and their interactions with the content. For example, the traffic to a particular website (e.g., as measured in terms of the total number of visits or the number of unique visitors in a given time span) can easily be ascertained, providing a useful metric for the general level of interest in the site. Similarly, the reputation that a website enjoys can be measured, for instance, based on the number of links directed to that site from other websites. In a commercial context, the click-through rate for advertisements is an important metric of the advertisements' effectiveness. For documents posted online, the number of downloads is a good indicator of a document's popularity.

While such web-traffic and related information can be useful feedback to the author, publisher, or other interested parties (e.g., online users searching for content on particular subjects), it typically provides only a rough conclusory indicator about the overall reception of certain content, but fails to provide any direct insight into the underlying reasons for and factors contributing to the content's popularity and reputation, leaving those up to speculation and/or experimentation through modifications to the content. Accordingly, there is room for improvements in tracking and analyzing user interactions with published content, and for acting upon collected user-interaction data.

BRIEF DESCRIPTION OF THE DRAWINGS

Some embodiments are illustrated by way of example and not limitation in the figures of the accompanying drawings in which.

DETAILED DESCRIPTION

Figure 1:
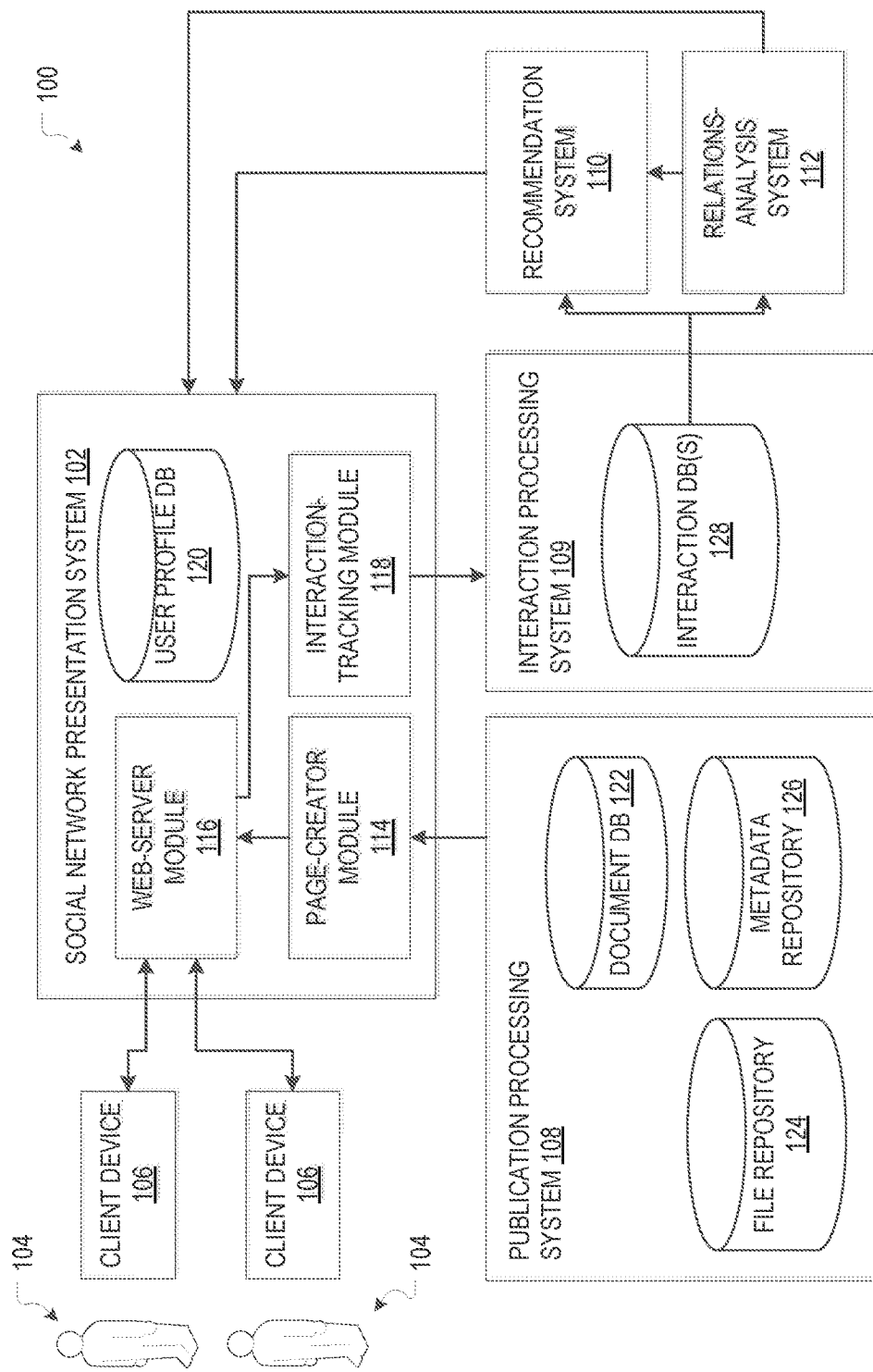
FIG. 1 is a block diagram depicting a social-network and publication system, according to an example embodiment, with functionality for tracking user-interactions.

Disclosed herein are systems and methods for tracking user interactions with documents published online and capturing the interactions in the form of user-interaction metrics, as well as for providing these metrics as a form of feedback on the content to users, or as input to computational methods for, e.g., computing impact and reputation scores, generating recommendations, and/or analyzing relationships between items of content, content providers (e.g., authors), and content consumers (e.g., readers). In various embodiments, this is achieved in the context of an online social network and publication system that stores a vast number of documents for access by its users. A document, as used herein, is any well-circumscribed and self-contained unit of content (which may, however, include references or links to other documents) generally including text and, optionally, figures, tables, audio and/or video files, or other content; non-limiting examples of documents include research articles or other research-related documents (e.g., data and analysis, or other research output, published directly within the online social network and publication system), books, reviews of other documents, and user profiles. User interactions, as used herein, range across varying degrees of engagement with the document—from passive consumption to the active contribution of feedback—and include, e.g., views, reads, scroll-throughs, follows (i.e., indications of an interest to read later), downloads, copy-and-pastes, clicks, highlights, mark-ups, annotations, citations, comments, and other types of user interactions. In accordance with various embodiments, tracking user interactions involves storing one or more parameters associated with each interaction; such parameters may include, e.g., an identifier of the document interacted with (that is, the "interaction object"), an identifier of the interacting user (that is, the "interaction subject"), and/or interaction attributes such as a time and/or duration of interaction or a type of interaction. Such contextual information about user interactions with online documents provides opportunities for enhanced interaction metrics and analysis.

In various embodiments, user interactions are tracked at a sub-document level of granularity; that is, at least some of the interactions are associated with document portions rather than documents as a whole. Documents such as research articles may, for instance, be broken down into their constituent sub-titled sections (such as, e.g., introduction, materials and methods, results, analysis, and conclusion). Alternatively or additionally, figures, tables, text, etc. may be treated as separate document elements, and text may also be further sub-divided into paragraphs, sentences, or even individual words. In some embodiments, each document is stored as a collection of individually addressable document elements that, together, contain the document contents. Documents may be provided at the outset in a highly structured format (using, e.g., a mark-up language such as HTML or XML to delimit the various document elements), or, if originally provided unstructured (as is the case, e.g., with an uploaded pdf file), analyzed to identify the document elements (e.g., based on visual delimiters such as white space). User interactions may then be tracked separately for the various document elements within a document (or for document portions comprising multiple document elements). In alternative embodiments, the document is stored as a single (e.g., full-text pdf) file, but certain types of discernible elements (such as citations or figures) and their locations within the document (e.g., in terms of a page number and/or x-y-coordinates) are identified and entered into a database. User interactions with these elements may then be detected based on the location within the document where the interaction occurs.

Tracking user interactions with specific document elements renders it possible, for example, to ascertain which portions within a document are the most-read, most-cited, or most-commented-on, which, in turn, provides insight into which portions are particularly interesting, influential, or controversial. Tracking interactions by document portion also allows defining more complex interaction types. For example, within a document, certain milestones capturing which percentage of the document has been read may be specified. Thus, a document-level interaction (namely, a percentage indicating which portion of the document a reader has reached) may be registered based on tracking user interactions at a sub-document level of granularity. Furthermore, sub-document-level user-interaction tracking allows defining indirect user interactions by imputing, to a given document, user interactions with document elements of other documents in which that given document is cited.

The tracked user interactions may be processed to compute (e.g., compute from scratch or update) user-interaction metrics, either in real time (using, e.g., stream-processing technologies) or at certain time intervals based on aggregated interactions, depending, e.g., on the type of interaction and the kind of metric. Further, as mentioned above, when user interactions are stored for subsequent analysis, various pieces of information may be recorded along with the type of interaction. For example, the record of an interaction may include a time stamp, facilitating, e.g., determining a history of the level of interaction with a certain document or document portion, and/or an identifier associated with the interacting user, which allows evaluating users based on how they interact with content (in addition to evaluating content based on how it is interacted with by users). In some embodiments, user interactions with a document are aggregated across subsets of the document elements to compute interaction metrics for different portions of the document at an intermediate level of granularity. For instance, if interactions are originally tracked by paragraph, they may be summed up for the different document sections.

The user-interaction metrics may include simple counts of interactions, such as total interaction counts, or interaction counts categorized by interaction type (such as clicks, downloads, or comments), group of interacting users (such as academic vs. non-academic users, users of various institutional affiliations, logged-in vs. not-logged-in users, etc.), or some other criterion. Total interaction counts are an example of a metric that may be updated in real time, i.e., each time an interaction has been detected. More complex user-interaction metrics include weighted counts, in which weights assigned to each interaction are summed up to derive the overall metric. The weights may be based, for instance, on the type of interaction, and may reflect a level of engagement within an interaction hierarchy. For example, when measuring the overall level of interest in a certain document or portion thereof, a copy-and-paste (which is indicative of a strong interest) may be assigned a greater weight than a mere read, and a comment or annotation may be assigned a greater weight than a mere highlight. Weights may also be based on a rating or evaluation of the content by the interacting user that is either implicit in the user interaction or derived from context. For example, in a citation count, a positive or negative multiplier may be applied to each citation, depending on whether the citation is positive or negative, as may be ascertained based on an automatic analysis of the text surrounding the citation. For reader votes on content via user-interface elements provided on the publication platform, the weight is implicit. Weights may also be based on some parameter associated with the interacting user, such as the user's reputation. Thus, in assessing the quality of a scientific publication, for example, a comment from a user who is highly regarded within the field of research to which the publication pertains may receive a greater weight than a comment from a lesser known user within the field. In general, when computing user-interaction metrics, one or more of the interaction parameters stored for the interactions are aggregated over, in a simple or weighted manner. The aggregation may be limited over a certain range or set of parameter values. For example, aggregation over time may occur within specified time windows, and aggregation over interacting users may occur over defined groups of users. In some embodiments, multiple tuple patterns are defined in terms of the values that the various interaction parameters can assume, and pre-defined interaction metrics are assigned to the various patterns.

Once interaction metrics have been computed, they may be displayed along with the content in textual and/or graphic/visual form. For example, interaction counts for a document or document portion may be shown numerically next to the document or portion. Alternatively, to visually distinguish different document portions based on their associated interaction metrics, a "heat map" of sorts that color-codes the interaction metric may be overlaid or displayed along with the content. For instance, the background color of text may be chosen on a color spectrum between red and blue to identify the most-interacted-with portions of the text as the "hottest" portions (e.g., by choosing a red background). As a variation, instead of altering the background color, a color band encoding the relative interest levels in each of the document portions may be displayed next to the document. In this manner, the reader, upon loading a document, receives an immediate, intuitive clue as to which portions have the highest interaction metrics. If interactions are tracked at a very fine level of granularity (e.g., clicks are associated with individual words, rather than entire paragraphs), the heat map will reflect an "interaction density" with the document. In accordance with various embodiments, this density is measured as a function, not of coordinates within the display, but of individually addressable content elements; thus, the measured interaction density becomes independent of the display device (which may be, e.g., a desktop computer, mobile phone, or tablet computer). Heat-map data can be provided in many different ways; further examples include bar diagrams showing the interaction metrics for various document portions, and summaries including excerpts of the various portions along with some representation of the interaction metric.

Heat-map data, or interaction metrics in general, can also be computed and displayed as a function of time, e.g., to reveal trends in interest levels for certain documents or topics. Temporal data may further be used to find correlations between different types of interactions. For example, it may turn out that citations of a document tend to follow extensive commenting and discussion on that document half a year earlier. Trends discovered based on interaction metrics may also be used to inform users in real time or near-real time of the topics and documents that currently meet with the most interest within an online environment. For instance, in a social network and publication system geared towards researchers, trending publications may be identified on the fly based on tracked views, downloads, or similar consumption metrics, and may then be shown to users, e.g., in the form of a chart, broken down by discipline and/or geographic territory.

Further, interaction metrics may be used to adjust the order in which portions of a document are displayed, either by re-arranging them within a web page, or by affecting the user's navigation flow through the page. For example, when following a link to a particular document, a reader may be sent directly to the most-read portion of the document, regardless of where within the document that portion is placed (e.g., beginning, middle, or end). Furthermore, in some embodiments, a high interaction density with a document, and in particular are large number of annotations and comments, may reflect a discussion that evolved around the document, which may in and of itself be of interest to other users. Accordingly, when the interaction density exceeds a certain threshold, the comments may be duplicated on a separate page as a discussion divorced from the underlying document. Further, the most-interacted-with portions of the document may be used to identify a topic of the discussion, which, in turn, may serve to link to thematically related discussions and documents. Interaction metrics may also be used to select content for display along with other documents. For example, in some embodiments, documents viewed by users are enriched with excerpts from other documents in which they are cited; the citing documents to be displayed may be selected, from among a potentially very large number of citing documents, based on the respective levels of user interaction they receive.

In addition to being published in one form or another, interaction metrics may also be communicated to users on an individual basis. For example, the authors of a published document may be sent email notifications about other users' interactions with their publication, for instances either periodically or triggered by particular milestones (such as, e.g., the $100^{th}$ view of the document). Notifications may also be sent to third-party (meaning, in this context, non-author) users. For example, a user may be informed that his department colleague's article, or a previous co-authors new publication, has just reached a certain number of views, downloads, or citations; in some embodiments, such notifications are bundled into regular news feeds tailored to user groups (e.g., users with a common institutional or departmental affiliation). Similarly, a user may find out, upon an active inquiry, which among the articles posted by his colleagues (e.g., within an academic institution) has the largest user-interaction levels.

Further, interactions tracked for an individual user may be used to adjust how content is presented to that particular user. For example, when a user resumes reading a document that she previously accessed, she may be automatically directed to the portion of the document where she left off; this is facilitated by storing the user's interaction (e.g., reads or scroll-throughs) with individual document elements. As another example, if a user tends to interact with certain document sections more than with others across documents (e.g., if she interacts more with the results or analysis section of scientific publications than with materials and methods), she may be automatically directed to those sections when accessing further documents.

Furthermore, in accordance with various embodiments, interaction metrics may flow into the computation of other scores and metrics or the discovery and analysis of various relations between users and content. Interaction metrics may, for instance, affect reputation scores computed for authors or interacting users, or impact metrics computed for documents (which may be inherited by the documents' authors via their contributions to the authors' reputation scores). In some embodiments, the availability of sub-document level interaction metrics is used to weigh the interaction metrics, in their effect on the reputation scores or impact metrics, based on the type of document element to which they pertain. For example, frequent user interactions with the introduction of a research article (which may be indicative of the article's appeal as general background reading, but do not directly speak to the merits of the published research) may boost the impact score for that article less than frequent user interactions with the results section. Similarly, the increase of an article's impact score due to indirect user interactions via interactions with other publications in which the article is being cited may be greater for citations that occur in results sections than for citations in introductions. As another example, the boost that a user's reputation score receives as a result of his active interaction with (e.g., comments on) the publications of others may depend on the importance of the document portions he interacts with (as measured, for example, based on aggregate user interactions for those portions across users).

Interaction metrics may also affect various types of recommendations (which may be made automatically based on algorithmically determined recommendation scores), such as recommendations of content to users to which the content may be of interest, recommendations of users as potential reviewers for certain content, or recommendations of documents or document portions that could or should be cited in other documents. Tracking user interactions on a sub-document level may enable more targeted recommendations than would otherwise be possible. For example, among research papers related to a certain topic, some papers may be recommended to experimentalists in the field based on high levels of user interaction with the "Materials and Methods" section, whereas others (or other portions of the same document) may be recommended to theorists due to high levels of interaction with the "Results" section. Conversely, when making expert recommendations based on the content that users (viewed as potential experts) interact with, a user's competencies may be more precisely inferred from her interactions (such as, e.g., comments she provides) if these interactions are tracked at a sub-document level.

Interaction scores may further be used to measure relatedness between two users, two or more documents, etc. A user's general interest may be inferred, for instance, from the contents and topics of the documents or document portions he strongly interacts with. If two users tend to interact with the same documents or the same kinds of documents or document portions, they likely have similar interests. Discovering this interest relatedness may be used, for example, within a social network and publication platform, to automatically suggest that the users connect with each other. For documents, subject-matter relatedness may be inferred in part from interactions of the same user, or the same group of users (e.g., researchers in a given area of research), with various documents. User-interaction analysis can, thus, flow into the classification of documents and determination of document clusters based on topics, supplementing topic determination and clustering based on keywords, textual overlap, and other relatedness indicators. For example, if a document has a high readership among radiologists, this may indicate that the document is related to radiology (even if that word does not occur in the document). In some embodiments, identifying documents as pertaining to the same subject matter and/or observing interactions of the same group of users with the documents is used as a factor in author disambiguation in cases where the listed author names are compatible, but do not unequivocally identify the author. Thus, two articles written by, e.g., "J. Smith" and "John Smith," respectively, may be determined to belong to the same author based, in whole or in part, on similarities of their contents or overlap in their readership.

For both interest-relatedness between users and subject-matter relatedness between publications, tracking and quantifying user interactions on a sub-document level improve the accuracy of the relatedness determination and contribute to a machine "understanding" of the document contents. For instance, by focusing document similarity metrics on the document portions that have the highest level of user interaction, the otherwise potentially diluting effect of more generic document portions (that is, portions less indicative of the overall topic of the document) can be diminished. For example, when determining document similarity based on keywords that two documents have in common, the similarity may be measured for individual sections, and a total similarity thereafter computed as a weighted combination of the section similarity. In the weighted combination, the most-read sections may get the highest weight. Furthermore, in identifying clusters of keywords associated with a given topic, e.g., for subsequent use in automatic document categorization by topic, keywords extracted from the most-read document sections may be given higher weight than keywords extracted from less-read document sections. In this manner, user-interaction data can contribute to automatically developing an understanding of the meaning of a given document or document section.

Various example embodiments will now be described with reference to the accompanying drawings. For context, refer to FIG. 1, which depicts an example social-network and publication system with functionality for tracking user-interactions, in accordance herewith. The system 100 includes, at its front-end, a social network presentation (sub-)system 102 through which users 104 at client devices 106 interact with each other as well as with the content stored in the system 100. At the back-end, a publication processing (sub-)system 108 processes and stores documents and related content and metadata, and an interaction processing system 109 stores and processes user-interaction data (which may include, e.g., citations). Various optional associated sub-systems, such as a recommendation (sub-)system 110 and a relatedness-analysis subsystem 112 use the data in further analysis tiers to compute, e.g., recommendation scores or relatedness scores as described above. The various subsystems 106, 108, 109, 110, 112 may be implemented on one or more computers (e.g., general-purpose computers executing software that provides the functionality described herein), such as a single server machine or a server farm with multiple machines that communicate with one another via a network (e.g., an intranet).

The social network presentation system 102 includes, in the depicted example, multiple functional modules (e.g., corresponding to different software modules executing on a server computer). A page-creator module 114 assembles web pages at least in part from content stored in the publication processing system 104, and a web-server module 116 serves the web pages out to the client devices 106 for display in a browser, and receives responses from the client devices. Ajax ("asynchronous JavaScript and XML") techniques may be used to track user interactions (such as mouse-overs, scroll-throughs, transient highlights (e.g., as used to copy-and-paste a portion of text), etc.) and communicate them back to the web-server module 116, e.g., by including in the web page, along with the content to be displayed, suitable JavaScript instructions for client-side execution in the browser. Alternatively or additionally, certain user interactions may be monitored by means of HTML forms that accept text input, radio-button selections, etc. An interaction-tracking module 118 within the social network presentation system 102 may preprocess the received user interactions and forward them to the interaction processing system 109 for storage and use thereat.

In some embodiments, user interactions with documents obtained from the social-network and publication system 100 are tracked regardless of whether the client device 106 is online or offline at the time the user views the documents. During disconnected use, the browser may execute instructions that cause the user interactions to be stored client-side in a buffer. Once the connection between the client device 106 and the system 100 is reestablished, the pre-aggregated user interactions are sent from the client device 106 to the system 100, where they can be merged with previously stored user interactions. For purposes of accurately reflecting the relative timing between user interactions tracked during online and offline viewing of documents, and to avoid duplication or omission of user interactions in the system 100, a reference clock synchronized with the server clock of the system 100 may be set up client-side.

In some embodiments, the social-network and publication system 100 limits access to some or all of the content and functionality it provides to registered users. In order to register, users 104 may provide user-profile information, such as a name, institutional affiliation, contact information (e.g., email address), etc., to the social network presentation system 102, and establish network-access credentials such as, e.g., a user name (which may be, e.g., her email address) and password. The user-profile information may be stored within a user-profile database 120 maintained, e.g., in the social network presentation system 102, as shown, or in the publication processing system 108. In some embodiments, the social-network and publication system 100 is geared toward academic users and other researchers, and eligibility to register as a user is based on certain conditions, such as academic credentials or publication records, and may be determined based on the user-provided profile information during sign-up. For example, eligibility to register may be established by providing an email address associated with an academic or research institution, a governmental agency dealing in research, or a private company with research and development activities recognized by the system; a comprehensive list of such institutions may be established, and extended from time to time upon request and/or as necessary, by a system administrator. Alternative factors that may render a user eligible to register include, for instance, co-authorship of a publication posted by an existing registered user, academic credentials proven to a system administrator in an application process, or receipt of an invitation to join the network by an already-registered user.

Once registered, a user may have the ability, via a user interface of the social network presentation system 102, to upload her research publications or other documents to the system 100. Alternatively or additionally, the system 100 may conduct a batch import of publications, e.g., by downloading them from openly accessible third-party publication repositories (e.g., as provided on the web sites of many universities), and subsequently allow its users to link their publications to their profile by claiming authorship (or co-authorship). For instance, as part of the sign-up process, or optionally during access of the system 100 at a later time, the system 100 may automatically present the new user 104 with a list of publications that match a combination of the user's name, affiliation, or other pre-determined matching signals potentially indicative of authorship, and request confirmation from the user that he is, indeed, an author of this publication. Sometimes, to comply with the copyrights of third-party publishers, users 104 may upload final drafts of their works, but not the final typeset publication as it appeared in the third-party journal. Alternatively to uploading a publication directly to the system, a user 104 may enter bibliographic information and/or provide a link to an external web site where the publication is available (e.g., for purchase). Further, in some embodiments, a user 104 may input the publication contents in a structured form used by the system 100, instead of uploading a single full-text file for the publication. A "publication," as used herein, may be a work already published by a third party (i.e., outside the social-network environment) (to the extent allowed by copyright law), such as an academic article included in a scientific journal, or, alternatively, a (perhaps preliminary) work first published within the social-network environment, such as a draft of an academic article that has not yet been submitted for publication to any journal (and may not be intended for such submission). In various embodiments, users are encouraged to publish original research directly on the system.

The publication processing system 108 forms the core of the system's back-end. In various embodiments, the publication processing system 108 includes functionality for converting documents provided in any of a variety of unstructured or structured document formats (such as pdf, Word, Latex, XML, HTML, or other formats) into a common highly structured format internal to the system (explained in more detail below). In the internal format, a document is represented in terms of its constituting elements—such as, e.g., paragraphs of text, images, tables, specially formatted text portions like citations, etc.; the level of granularity with which a document is broken up into such elements (e.g., section vs. paragraph vs. sentence vs. word) may vary between embodiments. The individual elements may be stored as entries of a document database 122, which are individually addressable. The document as a whole may be represented as an ordered list of its elements. Some of the elements, such as images, may have contents contained in individual binary files (which may not be amenable to further meaningful subdivision), which may be stored in a separate file repository 124 and linked to by the database entries of the respective elements.

In some embodiments, documents (or certain types of documents) are not broken up into and stored as a sequence of documents elements, but are instead analyzed to identify and locate only certain types of elements, such as citations or figures, which may be entered into the document database 122 (or another database), while the document as a whole is stored as a single file, e.g., in file repository 124. This way, the computational cost of converting the documents can be reduced, and ambiguities in ascertaining the document elements and their ordering can be avoided, while some structural information about the documents is still obtained. Documents in pdf format, for example, can sometimes be difficult to convert into a fully structured format, e.g., because of uncertainties in the automated determination of the text flow in some implementations. However, partial or coarse structural information about the document may be obtained from the distinctive formatting of some elements (such as different or larger fonts for section headings, bracketing of citations, etc.), and may be used, in accordance herewith, to generate individually addressable document elements. In order to properly place such document elements within a document that is not represented in its entirety as an ordered list of elements, the location of the extracted document elements may be stored in association with the elements, e.g., in terms of page numbers and/or coordinates within a page.

The publication processing system 108 may further extract and store metadata uniquely identifying each publication (such as the authors, title, and other bibliographic information), e.g., along with the document elements in the document database 122, or, as shown, in a separate publication metadata repository 126. The publication metadata may serve to represent and locate publications within the system and establish connections between publications, people (e.g., authors), institutions, and/or other entities. In some embodiments, citations (which may be regarded a particular type of publication metadata) are stored in a separate, bi-directional citation database that facilitates identifying all publications cited in and all publications citing a given publication. In addition to the source (i.e., citing) and target (i.e., cited) publication associated with a citation, an entry in the citation database may also include a source-publication excerpt surrounding the citation and/or the publication sentiment (e.g., whether the citation is positive, negative, or neutral).

The (wholly or partially) structured internal format in which publications are stored, in accordance with various embodiments, provides great flexibility in designing and tuning the layout of a document for display, allowing readers, for example, to selectively view only certain document portions of interest (e.g., only the figures, or only the citations). Further, it facilitates enriching the document with references and/or links to related content, mentioned in the document, that is likewise stored in, or at least known to, the system. For example, when identifying the author of a publication, the publication processing system may automatically insert a link to the author's public user profile within the social network presentation system. As another example, when finding, within a given publication, a citation to another article that is likewise available within the system, the publication processing system may automatically link to the cited article. Conversely, links to documents that cite a given publication may be displayed along with the document, e.g., embedded in or near a publication portion to which the citation pertains. The publication processing system 108 may also enrich documents with relevant content stored externally to the system, or references or links thereto, including, e.g., graphic representations of mathematical formulae or the structure of chemical compounds, links to DNA sequences or proteins (e.g., as available on the Protein DataBank at http://www.rcsb.org), or references to clinical trial information (e.g., available at http://www.clinicaltrials.gov), public funding information, vendor-provided information about commercially available products, etc. The dissection of the document into multiple constituent elements may also allow authors (or, more generally, users with editing privileges) to make changes to particular portions of the publication without requiring re-uploading the entire document; for example, a user may simply add a paragraph of text or substitute one figure for another. In conjunction with suitable version identifiers or time stamps, storing different version of individual document elements, rather than of the entire document, allows reconstructing the history of a document without unnecessarily duplicating stored content. A suitable referencing system may be used to maintain referential integrity across multiple versions of a document, i.e., to ensure that annotations made to a document within the system and references to the document from outside the system are always associated with the version of a document portion to which they pertain.

The system-internal representation of documents as a plurality of individually addressable document elements, in accordance with various embodiments, further facilitates tracking user interactions with the content at the level of these document elements. For partially structured documents, user interactions can be tracked for those individually addressable elements that have been identified, optionally in conjunction with further refinement based on tracked interaction coordinates. (For instance, even if the text of a page is not stored in terms of multiple elements, the highlighting of a particular portion of text can be stored and subsequently recreated based on coordinates of the highlight relative to a fixed page layout.) User interactions generally fall into two broad categories: "consumer interactions" and "contributor interactions." Consumer interactions are user interactions that are not actively submitted to the system by the user and do not alter the web page content as a direct result of user input submitted to the system (but merely in some cases indirectly via some posted representation of a user-interaction metric), and include, for example, views, reads, downloads, hovers/mouse-overs, scroll-throughs, copy-and-pastes, as well as transient mark-ups (e.g., temporary highlights that disappear when the user leaves the web page). Contributor interactions are interactions that involve an active user submission and generally directly affect the web-page content, and include feedback provided in various forms, such as textual feedback ranging from brief annotations to full-blown reviews, citations and references to other related content (e.g., data posted by the interacting user), permanent highlights or other mark-ups that become permanently visible to other users upon submission, ratings or labels, and so on. In this context, a (wholly or partially) structured internal document format facilitates referencing or interacting with specific document portions rather than the document as a whole. For example, it enables a user to post a question, comment, or citation in association with the particular publication portion (e.g., a particular section of text, or a particular figure) to which it pertains, and also allows inferences drawn from consumer interactions to be more focused (e.g., by taking the copy-and-paste of a particular document section as a strong indicator of user interest in this particular section).

Tracked user interactions and/or metrics derived therefrom (e.g., aggregated interactions) may be stored temporarily or permanently in the system 100, and may be organized in various ways. For example, user interactions or interaction counts (e.g., aggregated across users) for the individual document elements may be stored within the document database 122 as attributes of the stored document elements, and user interactions or interaction counts aggregated across documents for individual users may be stored in association with the user profiles in the user-profile database 120. To allow maximum flexibility for subsequent analysis and aggregation across various dimensions (such as users, document elements, types of interactions, time segments, etc.), individual user interactions are, in some embodiments, stored in a separate interaction database 128 maintained, e.g., in the interaction processing system 109. Each entry in the database 128 may specify the type of interaction (e.g., click, read, or comment), an identifier for the document element to which it pertains, an identifier for the interacting user, possibly a time stamp, and, if applicable, the feedback or content contributed (e.g., the text of a comment, a vote that was submitted, or the location of a highlighted section).

The interaction processing system 109 may further implement functionality for accessing the stored interaction data and aggregate and/or analyzes the tracked interactions to compute derived interaction metrics therefrom. The computation may, for instance, involve aggregating the individual interactions across certain dimensions of interest to obtain interaction counts, or weighted interaction counts, which may then be stored in the interaction database 128 itself (e.g., in a new table), or in other databases of the system (such as the document database 122). The interaction processing system 109 may also track how interaction metrics evolve as a function of time, or generate higher-level statics or assessments, e.g., by determining interaction levels for different document types or research areas, or evaluating correlations between user interactions and author-provided modifications to a document or follow-up publications, to provide just a couple of examples. In some embodiments, the tracked user interactions are directly forwarded to the interaction processing system 109 for real-time updates to certain interaction metrics; this makes sense, for example, for simple interaction counts, which do not require complex processing. For other metrics, tracked interactions may be stored and processed in batches, e.g., at regular intervals. As will be readily apparent to those of ordinary skill in the art, whether individual user interactions are stored at all, and if so for how long, can depend on various factors, including the interaction metrics of interest and available system resources.

Interaction metrics and other information computed and compiled by the interaction processing system 109 may be provided as input to other components of the system 100. For example, they may be sent to the web page generator 114, which may cause the information to be displayed in various ways, as further described below. Further, the recommendation and relatedness-analysis systems 110, 112 may utilize the tracked user interactions and derived interaction metrics in various ways. For example, in addition to providing search functionality that allows users to search for publications of interest (e.g., based on the field of research, the author's name, or specific citation information), the system 100 may automatically provide a list of publications potentially of interest, as computed by the recommendation system 110. The recommendation may be informed not only by explicit interest indications as may be reflected, e.g., in the user's profile (which may include, e.g., a list of her research interests and/or a list of her own publications), but also by the user's previous interactions with various documents, by the user interactions of other users that have similar interests (as may, in itself, be determined based on user interactions), and/or by the interactions of users in general with various publications. Whether provided in response to a search request or as an independent system recommendation, publications may be ranked based on various criteria (in addition to their relevancy to the user's request or the match to the user's interests in general), including, e.g., the explicit feedback they've received, the number of times they have been cited, or their reception as measured in terms of views, reads, or other consumer interactions. In addition to recommending publications to users, the recommendation system 110 may also provide functionality for identifying and recommending users as experts on the topic of a given publication or portion thereof, e.g., in response to a request for feedback submitted by the author, or a review request submitted by a consumer of a publication. Expert recommendations may be based on finding a match between the contents of the publication (or publication portion) on which feedback is requested with the contents created by various candidate-expert users, most notably their own publications, but also possibly reviews and other feedback they have previously provided, or other user interactions. Experts for various things, such as research equipment, materials, techniques, etc. may also be identified based on indirect user interactions, that is, user interactions with document portions that reference the subject of the desired expertise.

Figure 2:
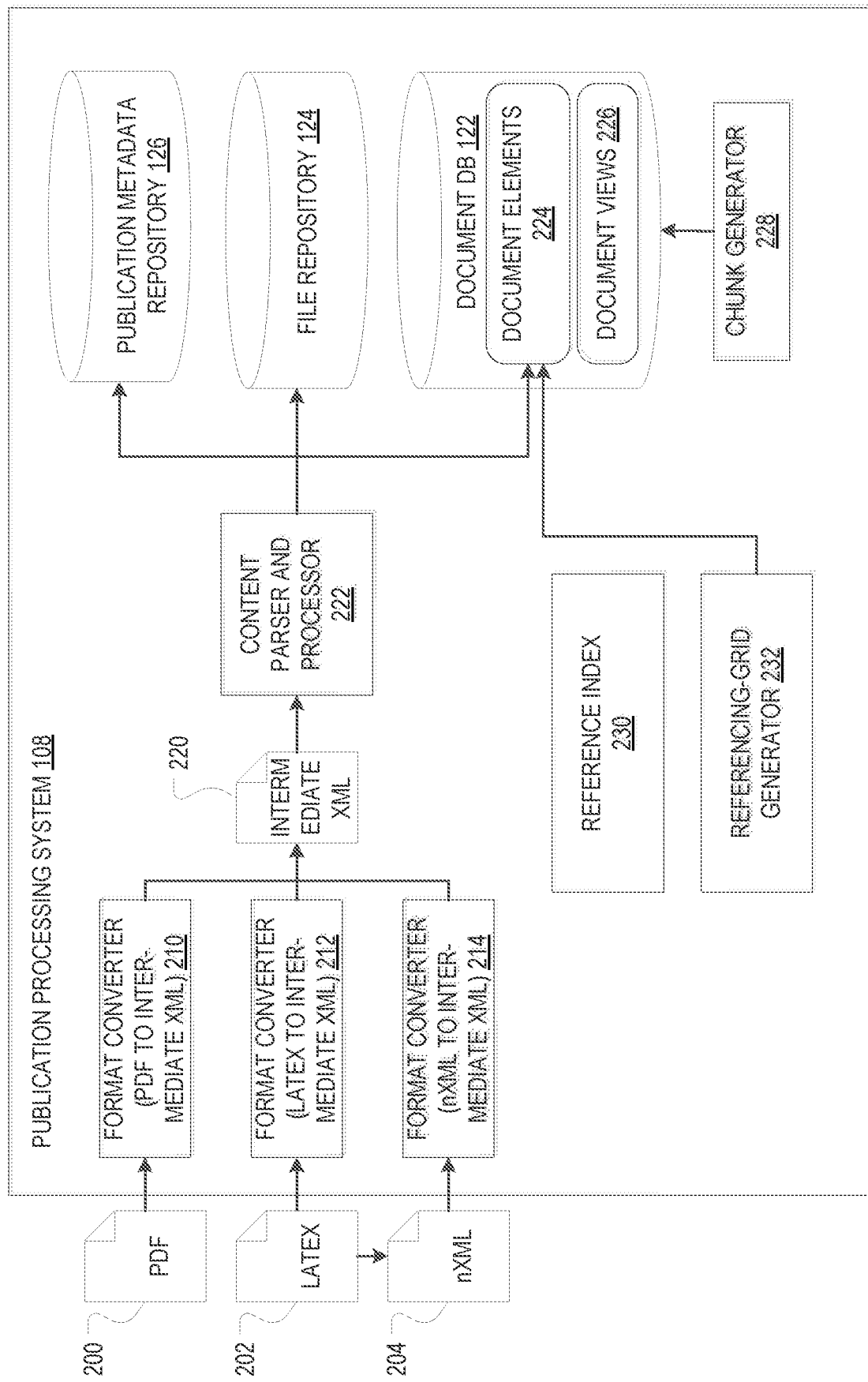
FIG. 2 is a block diagram illustrating in more detail components of an example publication processing system that stores documents in multiple document elements in accordance with one embodiment.

Having provided an overview of an example social network and publication system 100, example implementations of certain system components and aspects of the system's functionality will now be described in more detail. With reference to FIG. 2, an example publication processing system 108 that can generate representations of documents in terms of their constituent elements is described. The publication processing system 108 may be adapted to take publications as input in a variety of unstructured or structured file formats, such as, for example and without limitation, PDF (indicated at 200), Word, EPUB, Latex (indicated at 204), DocBook, nXML (indicated at 206), or HTML. A number of format converters 210, 212, 214 specific to these various external data formats may be used to convert the input documents into a common internal XML format (indicated at 220) that serves as an intermediate format for parsing the document contents. A content parser and processor 222 may then analyse the intermediate XML document 220 to break it up into multiple document elements, populating a document database 122 storing the document elements 224 in the process. The database entry for each element may include a unique document-element identifier and at least one document-element attribute characterizing the content. For example, for a document element consisting of a portion of text, the attribute may simply be a string containing the text. By contrast, for a document element including a figure, one attribute may store the figure caption as a string, and another attribute may store a pointer or link to the figure itself, which, in turn, may be saved as a binary file in a file repository 124 separate from the document database. The document elements themselves may be stored in JavaScript Object Notation (JSON) format. The document as a whole may be represented as an ordered list of its constituent document elements, which may be stored as a "document view" 226 (explained in more detail below) in the document database 122 (or, alternatively, a separate database). The content parser and processor 222 may further extract certain metadata descriptive of the document (such as its title, authors, and other bibliographic information) and store it in a separate metadata repository 126. A publication metadata entry within this repository 126 uniquely represents a particular publication (possibly with multiple associated versions) within the system 100. By contrast, multiple versions of the same publication result in multiple document views 226 being stored in the document database 122 (as explained in detail below).

In various embodiments, the content parser and processor 222 recursively breaks up the document into its constituent elements using a set of element-specific handlers. For example, handlers may initially split the document into only three portions: a front portion or "header" of the document that includes the metadata to be written to the database for publication metadata (which, in academic publications, typically includes the title, authors and affiliations, journal name, volume, and page if applicable, and abstract); a body of the document; and a back portion of the document that includes a list of citations. Another layer of handlers may then parse the body portion to identify conventional publication sections (such as introduction, experiments, results, analysis, conclusion) and/or separate text from figures, tables, formulae, etc. Within text portions, handlers may identify certain types of formatting, such as bold-facing, superscripts and subscripts, and so on. In this manner, a hierarchy of handlers may be used to ultimately convert the document from the intermediate XML format 220 into a flattened node structure of document elements 224. (Of course, as will be readily appreciated by one of ordinary skill in the art, different embodiments may differ in the details of their internal formats and the types of elements associated therewith.)

In various embodiments, the content parser and processor 222, when dissecting the intermediate XML document 220 into its elements, further enriches the document contents by linking the document elements, where appropriate, with related content within or external to the system. For instance, for a document element storing the name of an author, the content parser and processor 222 may include, as one of the element's attributes, a link to the author's public user profile (e.g., as maintained within the social network presentation system) or an external web site containing information about the author. As another example, when the content parser and processor 222 encounters a citation in the document, it may search the repository of publication metadata 126 for the cited publication and, if the cited publication is available within the system, include a link thereto in the document element for the citation. Links may also be included to institutions (e.g., universities, research facilities, etc.); products or vendors mentioned in a document (e.g., certain chemicals, laboratory equipment, etc.); grants or other funding sources for the research underlying the publication; publicly available information about drugs and clinical trials (e.g., as provided by the Federal Drug Administration), chemical compounds and materials (e.g., material safety data sheets); DNA sequences; or other types of systematized information.

In some embodiments, a user, when viewing a particular publication, has the option to customize the display to include only certain portions of the publication content she is interested in while omitting others. For example, the user may want to see only the table of contents, only the figures, only the citations, or only the results section of an article including the figures, but not more general sections like the introduction or conclusion. Various common selections of content from a publication may be pre-computed and stored as different "views" 226 of the document (not to be confused with the user interaction of viewing a document), which differ in the sub-sets of document elements they contain. Alternatively, views may be generated on the fly by applying appropriate filters to a document view that includes all document elements.

Different views 226 of a document may also serve to capture different versions during the document's lifecycle. When a user uploads, for instance, an updated draft of a document, the content parser and processor 222 may recognize based on the metadata extracted from the document that the document constitutes a modification of a publication that already exists in the system. Rather than storing each document element of the updated draft anew, the content parser and processor 222 may then create new entries in the document database for only those content elements that have changed relative to the previous document version. The document elements for the older version (or multiple older versions) remain unaffected, which allows any version of the document to be retrieved at any time. The updated draft as a whole may be stored as a separate document view listing all its document elements, including both document elements overlapping with the previous document draft and any newly added document elements. Compared with the document view of a previous version of a publication, the document view of a new version generally differs by the omission of one or more document elements and/or the addition of one or more document elements. In particular, a change within a document element (such as, e.g., modified wording within a paragraph of text) will generally be reflected, in the new view, in the omission of the old document element (e.g., the paragraph with the original wording) and substitution thereof by the new document element (e.g., the paragraph containing the re-worded text). Accordingly, the document elements themselves, as stored in the database, are not versioned, whereas the document views 226 are. Alternatively to storing a new document version in the form of a complete list of its constituent elements, it is also possible to store changes differentially with respect to a prior version. Thus, a document version may be defined by reference to a previous version in conjunction with lists of document elements that are to be removed from or added to the previous version to arrive at the new version.

In general, each document view 226 within the database may be identified by a combination of a unique key for the publication to which the view 226 belongs (as represented by the publication metadata, which generally does not change throughout the document's lifecycle) and a version or view identifier. The latter may be assigned or computed in various ways, for example, based on a suitable version-naming convention (e.g., "v1," "v2," etc.) or by hashing the contents of the views 226. Different document views 226 belonging to the same publication may be stored within a single "document object" (e.g., a single file or data structure) for the publication, or, alternatively, as separate document objects (e.g., separate files or data structures). In some embodiments, views 226 representing different content selections from the same version of a document are stored within the same document object. Views 226 representing different versions may be stored within the same document object (corresponding to "internal versioning") or as separate document objects (corresponding to "external versioning"), depending, e.g., on the magnitude of the changes or designations made by the author. For example, while a document is being edited and small changes are frequently made, these changes (reflected in new document elements created in the database) may be tracked within the same document object, using time stamps or other version identifiers to facilitate reconstructing the state of the document either continuously at any point in time or at least at certain discrete times (e.g., every hour or day). By contrast, once editing is completed and the author wishes to officially "release" a new version of the document, this new version may be stored in a completely separate document object.

When creating document elements for multiple documents and modifications to the documents as they may be made at various points in time, the document elements may in principle be stored in the document database 122 in the order in which they were created, resulting in the interleaving of different documents and document versions. When retrieving a particular document, the dispersed locations of its element across the database 122 will generally necessitate multiple individual database accesses and, consequently, take up significant loading time. In some embodiments, this is to a large extent avoided by storing the contents of each document in one or more "chunks" of elements stored in adjacent rows of the database; a chunk generator 228 may be used to break up a document into these chunks. For example, upon storage of the first element of a document within the database, a certain number of rows (e.g., the next ninety-nine rows) may be reserved for the next elements of that same document. Document elements belonging to a second, different document, even if created in the database prior to population of the first one hundred rows reserved for the first document, will be stored beginning in row 101, for example. Following a certain number of rows to be populated by the elements of the second document, a second chunk of the first document may be stored, and so on. This way, when a user requests a certain document to be displayed, the document can be loaded in typically just a few chunks, each including a set of contiguously stored document elements and thus requiring only one database search to locate the first element of the chunk. Since chunks usually store document elements corresponding to a contiguous content portion of the document (e.g., the first page of the print version of a document), latency in the display of the document may be reduced by displaying a document chunk as soon as it is loaded, without awaiting the loading of following chunks. The chunk size may be selected to achieve a suitable trade-off between short loading times and the display of document portions large enough to be meaningful to the user. (To illustrate, waiting for the entire document to be loaded before displaying anything may cause an unacceptably long initial wait time for the user following her request, while loading and displaying the document one sentence at a time will likely be frustrating for the user due to the frequent interruptions before she can go on reading.) Accordingly, the chunk size may be based on expected bandwidth limitations, the user's browser cache, the amount of content that fits on a screen (without requiring scrolling down), and similar criteria. Chunk size may also be tuned based on the frequency and extent to which publication documents are edited. For example, chunks may be sized, when a document is initially saved in the internal format, to include sufficient space for storing document elements reflecting subsequent modifications. However, to avoid, where possible, jumping between different chunks for a single new version of a document, the remaining space in the first chunk may be left unpopulated, and the elements of a new document version that differs significantly from the old one may be stored in the second (or a higher-numbered) chunk right away. In some embodiments, document elements that persist from one document version to the next are duplicated between chunks to facilitate faster loading of a new version (avoiding the need to retrieve unaltered document elements from one chunk and modified elements from another chunk). Furthermore, the chunks of a given document may be based on user interactions with that document. Chunks should, for example, be aligned with user-submitted highlights or similar mark-ups (so as to avoid a mark-up to span multiple chunks). Further, to improve the rendering speed of documents, chunks may be smaller for document portions with higher interaction densities, and may be optimized to improve, in particular, latencies associated with rendering the most interesting sections (as measured in terms of user interactions). Document rendering may further be improved by anticipating a user's reading behavior based on reading and interaction patterns exhibited by previous readers.

In various embodiments, users have the ability to annotate a publication with questions, comments, and the like. These annotations can be displayed along with the publication for viewing by other users. It is important, in this context, to remain referential integrity and display annotations only in association with the original document portions to which they pertain. For example, if a user comments that a certain paragraph needs clarification and the author thereafter posts an updated version of the publication in which he has re-worded that paragraph, the user comment should no longer appear along with the current version of the document (but should persist in the system in association with the older version). Similarly, references made outside the system to a publication within the system (e.g., a citation in an article published elsewhere to an article posted originally within the system) should always point to the same content, i.e., the content as it existed at the time the reference was made. To achieve such referential integrity across different versions of a document, and to allow annotations to specific portions of the document (as opposed to the document as a whole) in the first place, various embodiments employ a combination of a document key uniquely identifying the publication and relevant version thereof, a document path specifying a certain portion or range of elements within the document, a grid of anchors distributed across the document that is robust to changes in the document and may facilitate referencing at an even finer level than the document elements afford, and a suitable bi-directional reference index 230.

The document key is generally canonical, i.e., stands in a bijective relationship to the document object (or version within a document object, to the extent multiple versions are stored within the same object) it is referencing (e.g., such that each document object has only one key and each key identifies only one document object). (In various embodiments, the document key is but one example of a more general "object key" used to identify any type of social object within the system, whether it be a user, item of content (e.g., publication, comment, etc.), or relation, for example.) In some embodiments, the document key is composed of strong and weak entities. A strong entity stands on its own and maps to a particular publication (as identified, e.g., by its associated metadata), whereas a weak entity only exists (and may be unique only) in relation to a strong entity and references a version of the publication or a particular file or other asset associated therewith. Various embodiments utilize string-based keys that are readable by both humans and machines. For example, the strong entity may be structured as a domain-identifying pre-fix, such as "PB," followed by a domain-internal unique identifier, such as "1001," such that publication 1001 is identified by key "PB:1001." The second asset within publication 1001 (which may be, e.g., a figure) may be referenced as "PA:2" following the strong entity portion, i.e., as "PB:1001:PA:2." The document keys may be language-independent, allowing a key, for example, to be generated in Java code and resolved in PHP.

While the document key references an entire document (in a particular version), the document path facilitates pinpointing a piece of content within the document, such as, for instance, a particular paragraph or even an individual sentence or word therein. A document path is generally not canonical in that multiple different paths may lead to the same content within the document. (However, each path resolves, of course, to a unique portion of content.) For example, for references generated within the system, the document path may specify a particular document element, or range of elements, in terms of the associated unique document-element identifiers. Such a document path may, for instance, look like "anc:ce46fa85-anc:fd79bc98," which identifies the range from anchor element (a particular kind of document element, as explained below) with identifier ce46fa85 to anchor element with identifier fd79bc98. The same range of elements may be identified, alternatively, with reference to certain named portions of the document (e.g., the "materials and methods" section), in terms of page or paragraph numbers, and the like; this more human-readable referencing scheme, which is independent of the system-assigned element identifiers, is typically employed in external references to content maintained within the system, but may also be used internally. Examples of reference paths are "sec:1:par:2" (meaning: pointing to the second paragraph in the first section of a document, and relying on an unambiguous definition of a section), "sec:introduction:par:3" (pointing to the third paragraph of the introduction, which may be identified in the document database based on a document element labelled "introduction" in conjunction with counting document elements until the third paragraph is reached, "par:1-par:2" (specifying a range including the first and second paragraphs), and "page:2:lin:5:col:3-pag:2:lin:7:col:12" (specifying the range from page 2, line 5, column 3 to page 2, line 7, column 12). In various embodiments, modifications to a document trigger a check of and, if necessary, update to all references within the document that might be affected by the change. Thus, if, for instance, a new paragraph is inserted between the second and third paragraphs, a reference to the previously third paragraph may be updated to now point to the currently fourth paragraph. On the other hand, if a change is made in the introduction of a document, a reference to the first paragraph within the results section does not require any update.

In some embodiments, a referencing grid can be generated for a document by creating a set of "anchors" dispersed throughout the document. Anchors are document elements without content that serve solely referencing purposes. Each anchor has its own unique document-element identifier and is stored in the document database just like any content-containing document element. When anchors have been generated, by a referencing-grid generator 232, for a particular document, they are included in the document-element listing(s) that define the document view(s) 226. Anchors may be placed between document elements as well as be nested within document elements. The latter may serve to localize references at a sub-element granularity. Assuming, for example, that each paragraph of text corresponds to a different document element, multiple anchors may be located within one document, e.g., at natural breakpoints of the paragraph, such as at the end of each sentence, or at punctuation marks or other markers associated with different parts of a sentence. Alternatively, the document may be traversed with a sliding window to place anchors at regular intervals (e.g., every five words). The creation of anchors within the document database and the document views 226 may be accomplished by a special module within the publication processing system, denoted as a reference grid generator 232 in FIG. 2.

Using the grid of anchors, annotations to the document may be made with reference thereto. For example, each paragraph within a document may be associated with an anchor element preceding (or, alternatively, following) the document element storing the paragraph's text. If a user highlights a paragraph to comment thereon, the comment may reference the anchor associated with the document element for that paragraph. If the paragraph is subsequently changed and the document element for the original paragraph thus omitted from the element listing for the new version, the anchor for the comment may likewise be omitted (by virtue of its association with an omitted content-containing document element). As a result, the comment will not be displayed along with the new version of the document. By contrast, a comment tied to an anchor preceding a content element that has not changed between versions will continue to be shown. Similarly, if a user highlights, for purposes of an annotation, a particular sentence within a paragraph that is represented as a single content-containing element, but has multiple anchor elements spread throughout, the system may locate the anchors closest to the beginning and end of the highlighted sentence, and reference the portion to which the annotation pertains in terms of the distances (such as, e.g., "two words to the left") from these two anchors (or, alternatively, in terms of the distances of the beginning and end of the highlighted sentence from a single anchor).

In some embodiments, unique element identifiers for the anchors are created from hash values of specified portions of content preceding, following, or surrounding an anchor. For example, the identifier for an anchor nested within a paragraph may be computed as the hash value of the five words preceding and the five words following the anchor location. Similarly, the identifier for an anchor sitting between two document elements may be computed from the contents or, alternatively, the identifiers of the preceding and/or following document elements. Tying anchor identifiers to the contents in the vicinity of the anchor in this manner inherently ensures that any changes to the content result in the creation of new anchor elements with new identifiers and the omission of the old anchor elements affected by the change from the element listing of the new document version. As a consequence, annotations to outdated document portions will not be displayed with the updated document version.

In various embodiments, comments, questions, ratings, discussions, and other types of annotations to a publication document are stored as separate objects within the document database, optionally in a manner very similar to that in which the publications themselves are stored. For example, a comment may be broken up into comment elements stored alongside document elements, the comment as a whole being represented as a list of ordered elements. Further, metadata for the comment, such as its author and time of creation, may be stored separately. To facilitate the identification and retrieval of all annotations to a particular publication or portion thereof, the publication processing system may include a reference index 230 that stores links between referenced locations within the publication document (identified, e.g., based on the document key, document path, and/or anchor) and the identifier(s) of the annotation(s) pertaining thereto. The reference index may be bidirectional so as to also allow identifying, for a given annotation, the document portion that it references, or to perform more complex search and analysis tasks such as determining all publications on which a particular user commented. In other words, the reference index tracks all references between objects within the system and maintains their reciprocal sources and targets.

While the foregoing description explains the creation and exploitation of fully structured documents in accordance with certain embodiments, various features and functionalities described above may also be applicable to and enabled by partially structured documents. A "partially structured document," as used herein, is a document from which one or more elements have been extracted for storage as individually addressable document elements, but whose contents cannot be represented in their entirety in terms of these elements. Within the framework described with respect to FIG. 2, the document view 226 for a partially structured document may include a reference to the complete (full-text) document, which may be stored in file repository 124, and a list of the extracted document elements, along with their location within the full-text document. The extracted document elements themselves may be stored in the document database 122 in the same manner as document elements for fully structured documents, with references to files in the file repository 124 where applicable. To illustrate, consider the process of converting a pdf file into a partially structured document. This process may involve extracting the raw text from the pdf document (which can be accomplished with well-known techniques, e.g., using pdf.js) and analyse the raw text to identify citations and section headings, which may be stored as individual document elements 224 in the document database. The citation elements may be enriched, in some embodiments, with links the cited publication, to the extent available within the system. Further, figures may be extracted from the pdf document, e.g., by determining where within a page the text starts and ends and, based thereon, estimating the coordinate range spanned by a figure, which may then be "cut out" and stored as a separate file in file repository 124, with a corresponding entry of a document element 224 in the document database 122. Publication metadata may be stored separately in a publication metadata repository 126, just like for fully structured documents.

When a user accesses the partially structured document, she may be presented with the full-text document as is (or a slightly modified version in which, for instance, white space is trimmed to conform the document display to a given layout used in the system), supplemented by an overlay of the extracted document elements. The overlay need not be visible, but may be purely functional. For example, an overlay may render citations and images clickable by associating the coordinates where they occur in the full-text document with the extracted document elements, which, in turn, include links to the cited publications or separate files for the individual figures. Further, based on the extracted section headings, a document map may be created and displayed, e.g., as a navigational strip beside the document, allowing the reader to click on any section, and thereby jump to the page where that section begins. User annotations to the document may be associated either with any of the extracted document elements (e.g., with a section heading of the section to which the annotation pertains) or, on a finer level of granularity, with x-y coordinates within a page (which constitute the document path for the annotation). The partial structuring also facilitates (within limits) providing different views of the document. For instance, instead of displaying the entire document, a view may show only the extracted citations, or only the figures. In some embodiments, fully and partially structured documents a stored alongside each other in publication processing system 108, and are presented to the user in a uniform way, rendering them indistinguishable (or close to indistinguishable) in appearance and functionality for user interactions.

Figure 3:
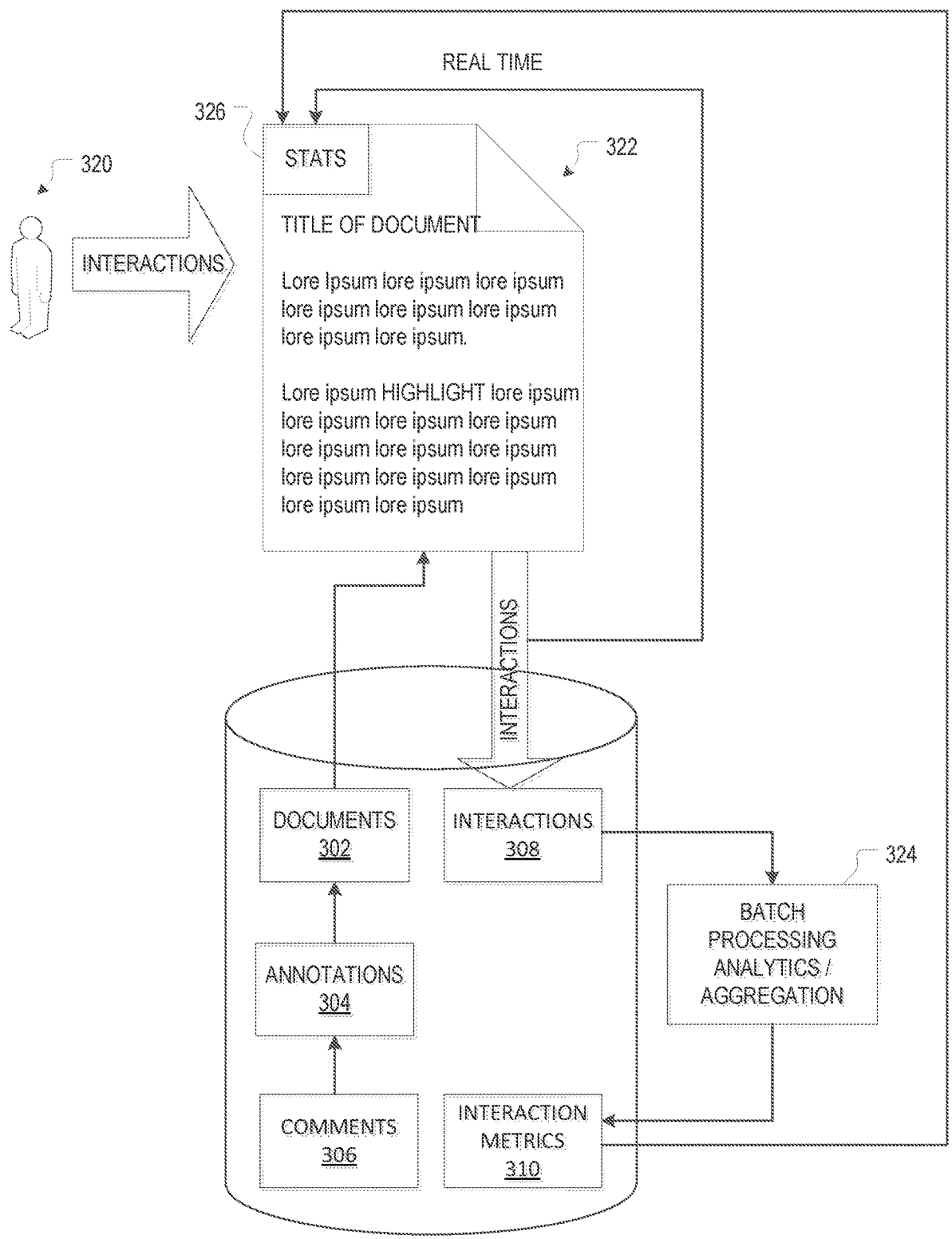
FIG. 3 is a schematic diagram illustrating an example workflow and system for tracking user interactions in accordance with one embodiment.

FIG. 3 schematically depicts an example workflow for the tracking, storing, processing, and use of user interactions, in conjunction with pertinent components of the social network and publication system 100. In this example embodiment, a database 300 (corresponding to document database 122 and interaction database 128) stores documents, annotations to the documents (which may include highlights and other mark-ups or inserted references to other content), comments on the documents, user interactions with the documents, and user-interaction metrics derived from the stored user interactions, in various tables or sets of tables 302, 304, 306, 308, 310. As explained above, a document may be stored as a collection of document elements identified by a document key and document path. Annotations reference the document key and document path of the document element to which they pertain, and comments are, in turn, linked to the annotations (or directly to the document elements). User interactions may reference both document elements and, where applicable, annotations and comments. At a given time, when a user 320 accesses a document, a user-interface screen 322 displaying the contents of the document, along with annotations and comments as well as user-interaction statistics, is created and sent to the user's client device for display thereat. User interactions with the document are tracked and stored in the database 300 in user-interaction tables 308.

Some types of user interactions may be "explicit" in that they immediately affect the display of the document. For example, permanent highlights and comments provided by a user may show in the document as soon as they have been saved and submitted by the user. Further, certain interaction counts, such as the number of views or the number of downloads of a document, may be incremented in real-time. Other types of interaction metrics may be "implicit" in that they are not reflected in the displayed content directly and in real-time, but are accumulated in the database tables 308 and subsequently exported (e.g., to the user-interaction processing module 130) for processing in batches (generally indicated at 324). Interaction statistics derived from the aggregated user interactions may be separately stored in interaction-metrics tables 310, and incorporated in various ways into the document presentation (generally indicated at 326).

For different types of user interactions and interaction metrics, different pieces of information may be stored in the user-interaction and interaction-metrics tables 308, 310. For individual, discrete user interactions, the document key and path of the document element(s) where the interaction occurred are generally stored. This document key and path are the "source key and path." Some types of interactions also have an associated "target key and path" that may likewise be tracked and stored. For clicks on hyperlinks, for example, the interaction entry for the click includes the document key and path of the document element that includes the hyperlink (the source) and the document key and path of the destination document element for that hyperlink. Also, if a user includes, in a comment to one document, a citation to another document, the interaction entry for this annotation may store both the document key and path of the document element being annotated and at least the document key (and, if reference to a specific section or point within the cited document is made, the document path) of the document (element) being cited. For certain more complex interaction types, interaction-type-specific data may be stored. Scroll data for a document, for instance, may include, along with the document key, a list of all document elements (identified by the document paths) through which a user scrolled during a given session. Alternatively, if certain "milestones" have been set at predetermined elements within the document, corresponding to various percentages of the document having been read, the scroll data may simply store, along with the document key, an identifier of the last milestone that was reached during the session (e.g., a number out of ten pre-defined milestones total, or a name of a particular milestone). Some interactions, while perceived as a single interaction by the user, may be captured, for purposes of storage and analysis, as multiple user interactions. For example, when a user copies and pastes, or highlights, a section of a document, a corresponding user interaction may be noted by the system 100 for each document element encompassed in the copy-and-paste or highlight. Further, for some types of interactions, it may be beneficial for subsequent analysis to explicitly store (rather than ascertain later when needed) some parameter or characteristic of the associated document or document element. For instance, for click-data analysis, it may be useful to make note of the type of document that was clicked on, e.g., whether it was a publication, comment, publication review, etc.

Figure 4:
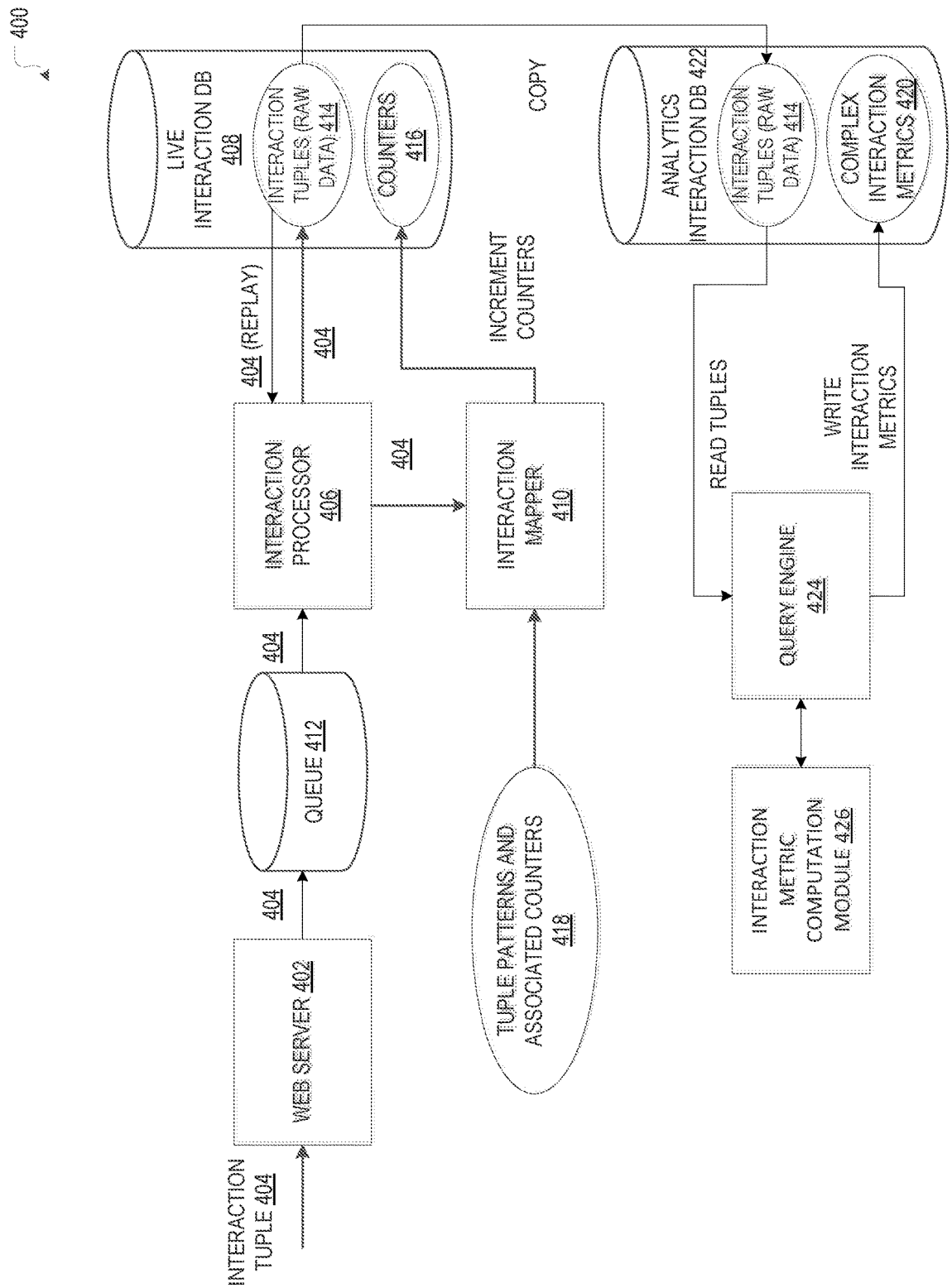
FIG. 4 is a block diagram illustrating an example interaction tracking and processing system in accordance with one embodiment.

FIG. 4 is a block diagram illustrating an example interaction tracking and processing system 400 in accordance with one embodiment. The system 400 includes a web server 402 (e.g., corresponding to web-server module 116 of the social network and presentation system 102) that interacts with client devices 106 to serve out content and receive information about user interactions with the content from the client devices 106. The information about the user interactions is provided, in accordance with an example embodiment, as a tuple 404 of interaction parameters for each interaction (herein also called an "interaction tuple" for brevity), e.g., in JSON format. The fields in the tuple 404 may follow the standard definition of an "action," which includes, in addition to a time stamp, an "actor," a "verb," an "object," and optionally a "target." For user interaction tracking, the actor may map onto the interacting user (who need not always be a human, but could also be, e.g., a service), the verb on the type of interaction (e.g., view or comment), the object on the interacted-with document or document element, and the target on any other kind of information that provides context. Herein, the (optional) target is referred to as metadata. The fields in the tuple may (but need not) include multiple sub-fields. To illustrate by way of example, the tuple (timestamp: 1234, actor: (id: 123, type: person, display-name: Mary Muller), verb: "view", object: (id: PJ:123456, type: publication), metadata: (affiliation: MIT, country: Australia))

indicates that a user interaction occurring at time 1234 (e.g., measured in milliseconds from some start date and time) was performed by a person named Mary Muller, having user identifier (user ID) 123, and involved Mary's view of a publication with the publication identifier (publication ID) PJ:123456. The metadata indicates that Mary is affiliated with MIT and accessed the publication from a computer in Australia.

The tuples 404 of interaction parameters may come into the web server 402 as a constant "activity stream" (as the term is understood in the art), and are passed on to an interaction processor 406 that channels each tuple 404 to a live interaction database 408 for storage as well as to an interaction mapper 410 for updating associated interaction counters. The interaction processor 406, live interaction database 408, and interaction mapper 410 may be implemented, e.g., within the interaction processing system 109 (the live interaction database 408 corresponding, e.g., to the interaction database 128). To enable asynchronous processing of the incoming interaction tuples 404, and to avoid data losses in case of a failure or disconnection of the interaction processor 406, a queue 412 may be connected between the web server 402 and the interaction processor 406. The queue 412 constantly receives and buffers interaction tuples 404 received at the web server 402, and the interaction processor 406 pulls the interaction tuples 404 from the queue as it is able. In the live interaction database 408, the interaction tuples 404 are stored as is (that is, as "raw data" 414). In addition, the live interaction database 408 may store counters 416 determined based on the interaction tuples 404.

Counters are determined, in accordance with the illustrated embodiment, based on patterns of interaction parameters. Patterns correspond to certain combinations of sets or ranges of values of the interaction parameters. For example, one pattern may be defined as a person (actor) viewing (verb) a user profile (object). Another pattern may be defined as a person (actor) interacting with (verb) a publication (object); in this case, the pattern applies to interactions regardless of interaction type (i.e., the verb can take the full range of values). The interaction mapper 410 accesses a list 418 of defined tuples and associated classes of counters (e.g., specified in a table or configuration file). A given pattern may have multiple associated classes of counters, and each class of counters may be defined in terms of a combination of the fields or sub-fields of the interaction tuple in conjunction with the tuple pattern. When the combination of fields or sub-fields is evaluated for a particular interaction tuple, that tuple maps, as a result onto a particular instance of the counter class (that is, onto a particular counter). For example, to count the numbers of views individual documents receive, a tuple pattern involving publication views by persons can map directly onto the document ID listed in the object field: person-view-publication→object.id. With this mapping, each document (uniquely identified by the associated document ID) has its own view counter. As another example, to count the number of interactions that individual documents receive from persons located in particular countries, all tuple patterns involving an interaction by a person with a document may be mapped on the combination of the document ID and the country field of the metadata:

person-view-publication→object.id,metadata.country;
    person-cite-publication→object.id,metadata.country;
    person-comment-publication→object.id,metadata.country;

and so on for all types of interactions. With this mapping, each document receives separate interaction counts per country for each type of interaction. Based on the identified tuple pattern and associated counter class, the interaction mapper 410 increments all counters associated with an incoming interaction tuple 404, that is, in the live interaction database 408, 1 is added to each counter onto which the tuple 404 maps. The key for each counter is based on the tuple pattern and the values of the specified combination of fields or sub-fields. In some embodiments, these values in conjunction with the pattern are simply hashed to obtain a unique counter for each combination of the values. The hash may also be based on a combination of the time stamp and one or more other interaction parameters. For example, in addition to keeping a global counter updated for a given tuple pattern, separate interaction counters may be created every minute and/or every day. To achieve daily counters, for instance, the portion of the time stamp corresponding to the date may be hashed (along with the interaction parameters that define the given tuple pattern). Interactions on the same date will then cause the same counter to be incremented whereas interactions on different days will result in different counters or increments thereof. As will be appreciated by one of ordinary skill in the art given the benefit of the instant disclosure, the mapping of tuple patterns onto counters in the manner described above can facilitate updating the counters in real time or near real time.

Due to inevitable system imperfections, it can happen, from time to time, that counters become erroneous or inconsistent. For example, a daily counter may diverge from the sum of all corresponding minutely counters for the same day. This problem can be remedied, in accordance herewith, by replaying the interactions from a give point in time and recounting. Replaying interactions involves sending interaction tuples 414 stored in the live interaction database 408 back through the interaction processor 406 (directly or possibly through the queue 412) to the interaction mapper 410 for reprocessing by the interaction mapper 410 (or a separate instance of the interaction mapper 410, e.g., to keep the processing of fresh interactions separate from the reprocessing of old interactions). In addition to facilitating counter corrections, storing and replaying the interaction tuple raw data 414 may also serve to retroactively introduce new counters. Thus, if a new tuple pattern and pattern-to-counter mapping are defined, e.g., to capture an aspect of user interactions previously not contemplated, application of the new pattern and mapping is not limited to future interaction data, but can be extended to the stored historical interaction data as well.

Of course, the processing of the interaction tuples 404 is not limited to automatic real-time updates to various counters, but can include the computation of more complex interaction metrics 420, e.g., metrics that involve database lookups not achievable in real-time, or other further analysis. For this purpose, the interaction tuple raw data 414 may be duplicated in a separate analytics interaction database 422, where it may be accessed, e.g., via standard database queries executed by a suitable query engine 424 (e.g., a Structured Query Language (SQL) engine). This access pattern provides flexibility to process the interaction tuples in any desirable way, e.g., in conjunction with data stored elsewhere. The query engine 424 may read specified interaction tuples 404 from the analytics interaction database 422 and, after processing by, e.g., an interaction metric computation module 426, write complex interaction metrics back to the database 422.

Various applications of user-interaction tracking functionality in accordance herewith will now be described.

Figure 5:
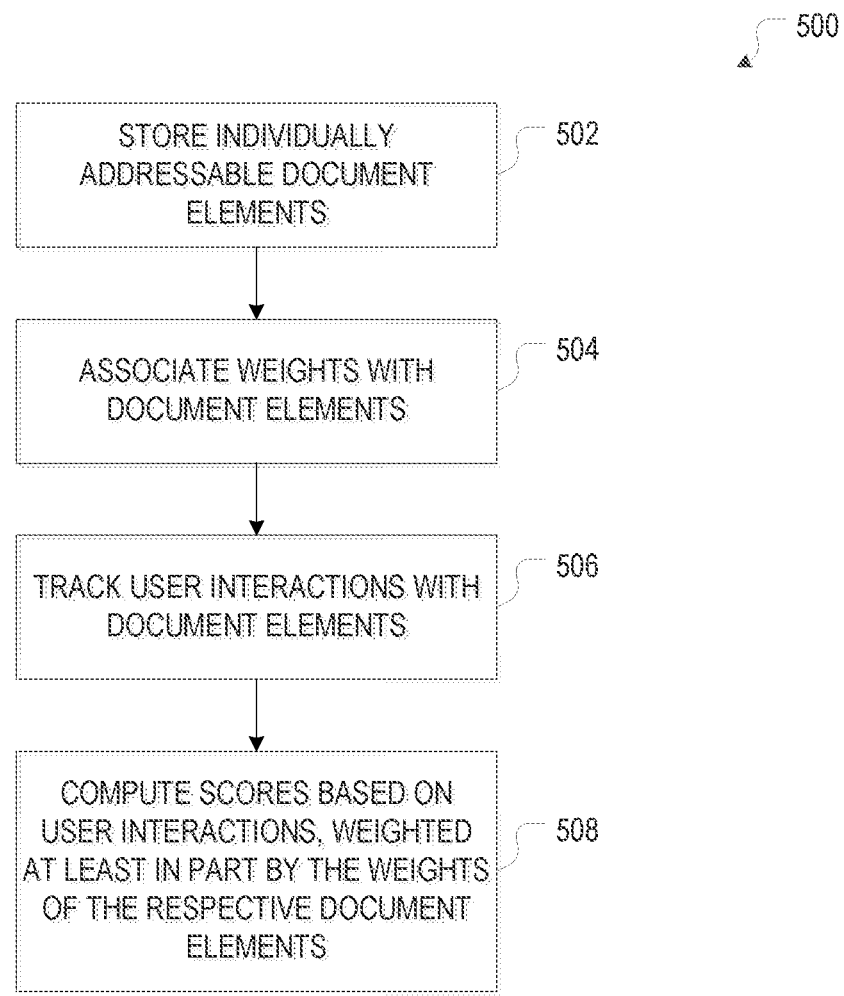
FIG. 5 is a flow chart of an example method for using user interactions tracked on a sub-document level of granularity to compute scores associated with documents, authors, interacting users, etc., in accordance with various embodiments.

Referring to FIG. 5, an example method 500, in accordance with various embodiments, for using user interactions tracked on a sub-document level of granularity to compute scores associated with documents, authors, interacting users, etc. is illustrated in the form of a flow chart. The method 500 involves storing individually addressable document elements for a plurality of documents in an electronic data repository (e.g., document database 122) (action 502), and associating a weight with each document element (action 504). Further, the method 500 includes tracking user interactions at the level of the individual document elements (action 506), and computing one or more scores based on the tracked user interactions, weighted at least in part by the weights associated with the respective document elements that were the objects of the interaction (action 508). In some embodiments, the interactions are further weighted by other interaction parameters, such as attributes of the interacting users, types of interactions, times of interaction, and/or durations of interaction; such additional weights may be combined with the document-element weights (e.g., by multiplication or addition) to result in an overall weight for each interaction.

A score may be computed by aggregating over a certain set of interactions to obtain a weighted count of interactions (that is, the sum of weights associated with the interactions). Aggregation may occur, e.g., over all interactions with a given document to determine a document-specific score (e.g., an impact score), over all interactions with a set of documents by a given author to determine an author-specific score (e.g., a reputation score), or over all interactions by a given interacting user to determine a user-activity score. Scores for certain objects may also be computed indirectly based on interactions with document elements that reference these objects. For examples, a citation-based score for a publication may be based at least in part on user interactions with documents citing the publication, weighted by the weights of the respective document elements. In this manner, the weights associated with the elements of one document can be inherited by another document. Similarly, scores can be inherited by topics associated with documents. For example, to gauge general interest in a certain topic, an interest score may be computed based on user interactions with documents relevant to that topic. Scores can further be associated with pairs or groups of objects and measure their relatedness. For example, user interactions of two users with overlapping sets of documents and/or document elements can be used as an indicator of interest-relatedness between users. Conversely, user interactions of one user with multiple documents may serve as an indicator of subject-matter relatedness between the documents. In general, for different scores, different sets of weights may be defined for the various document elements. However, it is also possible that multiple different scores share a common set of weights. In some embodiments, the computation of scores is carried out in two steps: first interaction metrics are computed based on the user interactions, and then a score is computed as a function of one or more of the interaction metrics.

The weights assigned to different document elements generally serve to differentiate between user interactions based on the portions of a document with which they occur, and may be based, for example, on a set of specified types of document portions that are generally applicable across the plurality of documents. For instance, research publications tend to be structured in a number of standard sub-titled sections, such as background or introduction, materials and methods, results, analysis, and conclusion. User interactions with one of these sections versus another may provide clues about the general thrust or impact of the document (e.g., whether it is suitable as general background reading or relevant for the experiments it describes or for its conclusions) and the relative importance of the various sections, as well as about the interests of the interacting users. Accordingly, depending on what a particular score is intended to measure, the different sections may be assigned different weights, and these weights are inherited by the document elements belonging to the respective sections. Note that not every document need to include all of the specified sections; as long as the documents are sufficiently comparable to provide substantial overlap in the sections, a comprehensive set of document-portion types that is applicable to all documents can generally be defined. Instead of defining document portions in terms of sections, portions may also be defined, and document elements belonging to the various portions accordingly be weighted, based on the type of content. For example, text, images, and citations may be considered different portion and be weighted differently.

Figure 6:
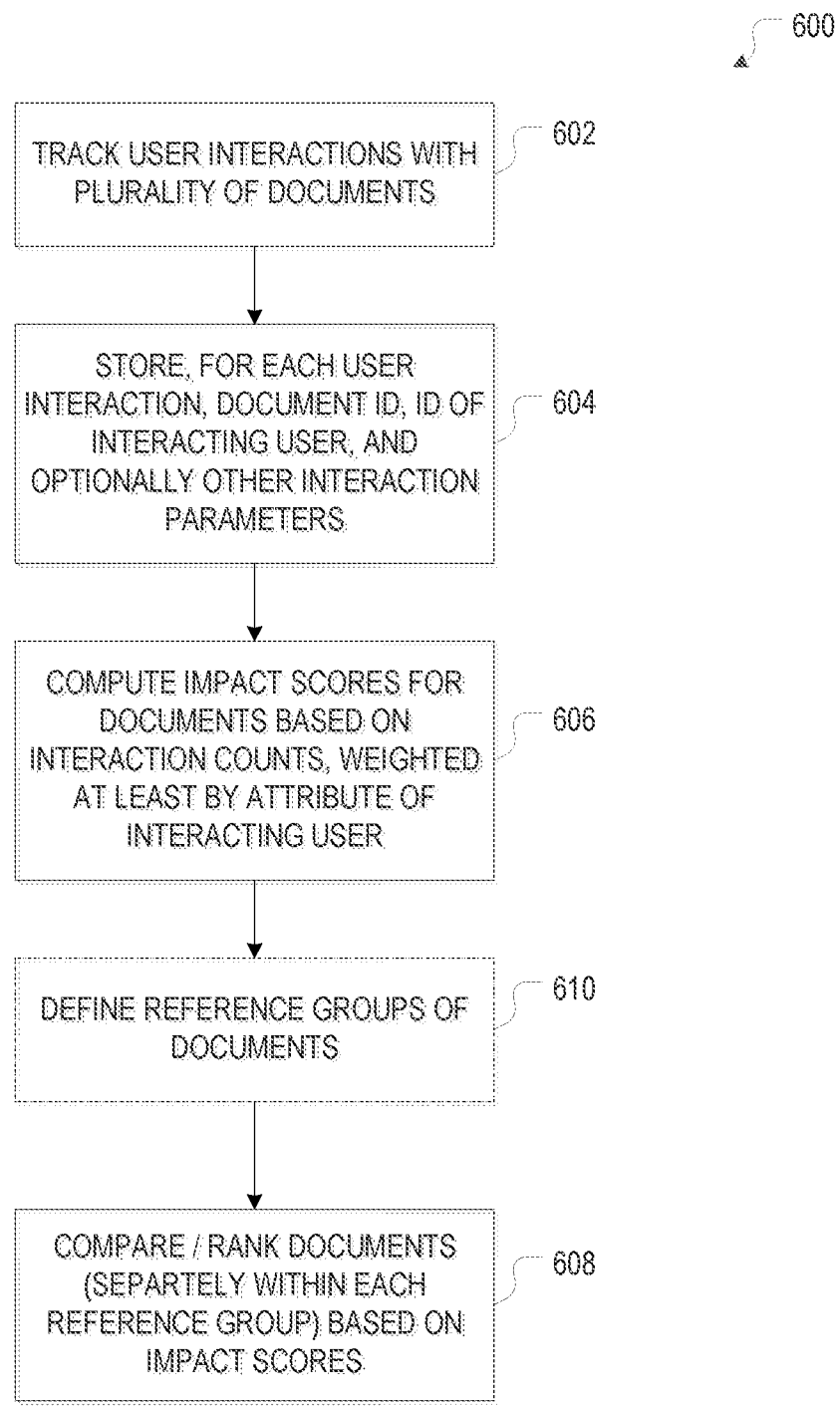
FIG. 6 is a flow chart of an example method for computing impact scores for a plurality of documents based on tracked user interactions, in accordance with various embodiments.

FIG. 6 illustrates an example method 600, in accordance with various embodiments, for computing impact scores for a plurality of documents based on tracked user interactions. The method 600 may be useful, for instance, in evaluating the impact of research articles or other documents related to research results. In contrast to the predominant conventional mode of assessing research-publication impact, which is based on the number of citations that the publication receives, the method 600 allows taking different types of interactions with a research (or other) document into account (possibly with different weights) when assessing its impact. The method 600 involves tracking online user interactions with a plurality of online documents (action 602) and storing, for each of the interactions, a plurality of associated interaction parameters (action 604). The interaction parameters may include, in addition to an identifier of the document interacted with, an identifier or attribute of the interacting user, the type and/or duration of interaction, a time of interaction, or other criteria. Based on the tracked interactions, impact scores are computed for the documents, each impact score being based on a weighted count of interactions with the respective document, each interaction in the count being weighted based at least in part on one or more attributes of the interacting user (action 606). User attributes upon which the weights may depend include, for example, the reputation or seniority of the interacting user, or her expertise in the discipline associated with the document.

Weighting may also depend on whether the interacting user is an author of the document (in which case her interactions may be discounted, in some cases even be set to zero) or shares a common (e.g., institutional and/or departmental) affiliation with one of the authors (which may likewise result in discounting her interactions with the document). Furthermore, in order to avoid artificial boosts to documents based on automated interactions by robots and the like, interactions by non-human actors may be discarded (i.e., have associated weights set to zero). As a mechanism for fraud detection, interactions may also be monitored for repeated interactions with a document by the same user or cluster of users. Such clusters of users acting in concert (e.g., to artificially inflate a score for a particular document) may be detected, e.g., based on common affiliations, IP addresses of client devices at which the interactions take place, or social connections between the users. If repeated interactions by a user or user cluster with the same document exceed a specified threshold, all interactions by that or those users with the document may receive a weight of zero.

In addition to being weighted based on attributes of the interacting users, the interactions may be weighted based on interaction durations (e.g., with longer interaction durations corresponding to higher weights), types of interactions (e.g., with contributor interactions being weighted more than consumer interactions, or in accordance with some other ranking or hierarchy of interaction types), or, if facilitated by sub-document-level interaction tracking, weights assigned to document elements or document portions (e.g., interactions with an introduction being weighed less than interactions with other sections). Further, in some embodiments, the impact scores are based, not on all interactions with the document that have taken place, but only on interactions that fall within a specified time window. For example, impact scores may be (re-)computed for periodic intervals, e.g., every day or every month. In this case, the time window may be specified relative to the time of computation, such that each score is based on, e.g., the immediately preceding day or month.

Impact scores for documents need not be aggregated across all users, but may be specific to a certain user group, defined in terms of, e.g., a research discipline or geographic region (such as country, state, or continent) in which its members operate, an (academic, research, or other) institution to which its members belong, or a seniority level or status of its members. For the same document, multiple impact scores specific to multiple such user groups can be computed. In this way, the impact of a document on, for instances, students can be measured independently from the impact on senior researchers.

The impact scores computed for the documents (action 606) may be compared with each other (action 608), e.g., for the purpose of ranking documents. In order to ensure that such comparisons are meaningful, they may be confined to comparisons between documents within certain reference groups of documents. For example, it may make little sense to compare the impact of a medical publication with that of a linguistic publication. Thus, medical publications and linguistic publications may be assigned to different reference groups (action 610), and rankings and comparisons performed only with each group. In addition to disciplines and sub-disciplines, reference groups of documents can be formed based on, e.g., author seniority, funding sources, countries, or publication dates of the documents. A funding agency may, for instances, be interested in the relative impact of various research projects it supports financially, as measured by the impact scores of documents presenting the research output.

Figure 7:
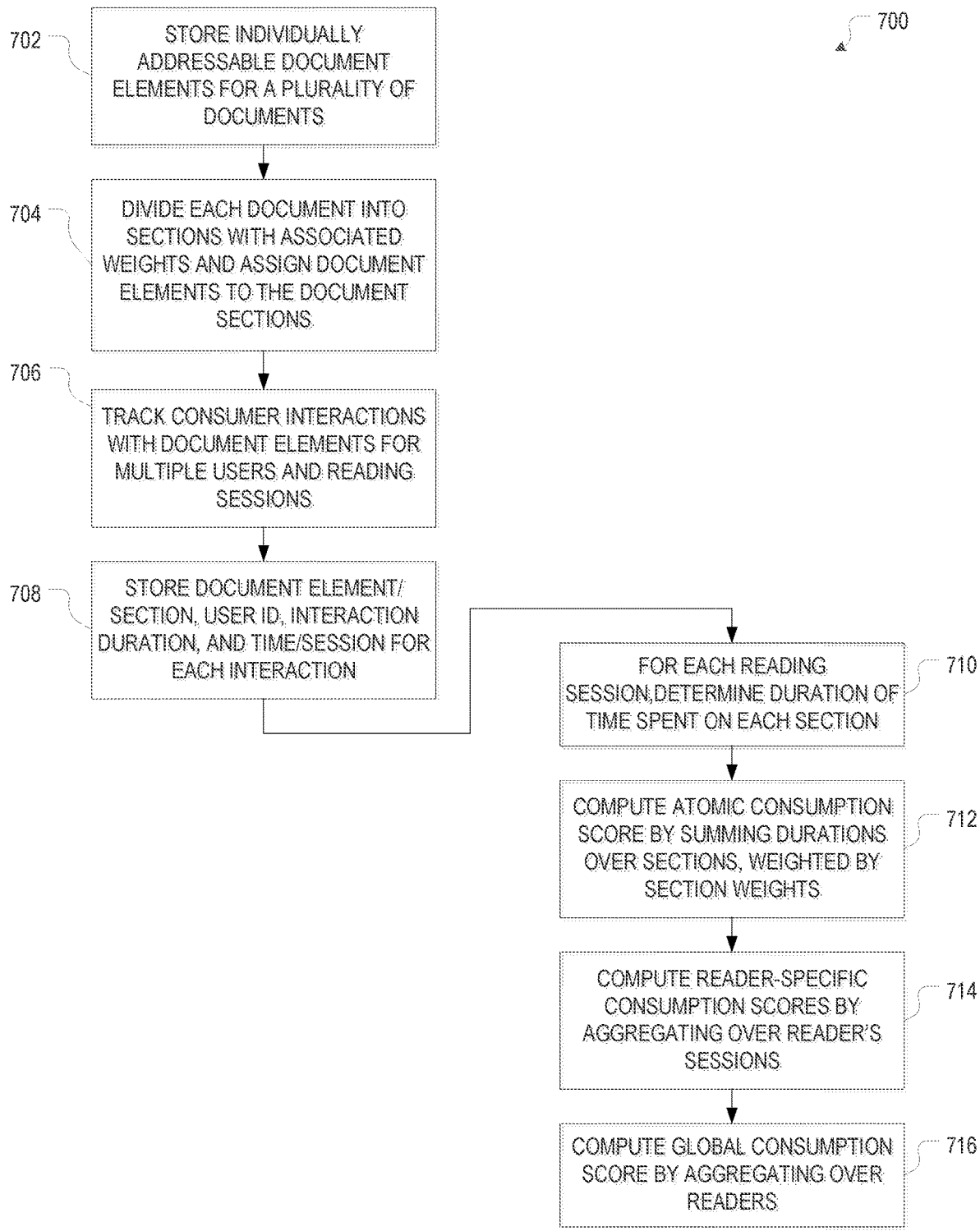
FIG. 7 is a flow chart of an example method for determining example complex consumption metrics for documents, in accordance with various embodiments.

FIG. 7 illustrates an example method 700, in accordance with various embodiments, for determining example complex consumption metrics for documents. The metrics take into account both which portion of the document a user interacts with and how long she interacts with that portion. Thus, it can provide a much more nuanced gauge of user interest in the document than, for instance, a simple count of reads for the document. The method 700 involves storing individually addressable document elements for a plurality of documents (action 702) and assigning each document element to one of multiple weighted sections of the documents (action 704). The sections may be, e.g., the sub-titled sections of the document, or otherwise defined distinct document portions that have different degrees of importance reflected in their different section weights and are generally applicable across documents. The section weights may be set based on a suitable heuristic, e.g., giving higher weight to sections generally having more unique content (e.g., a conclusion) than to sections that are more generic (e.g., a background section). The document elements may coincide with the sections, or may be sub-portions of the sections such that each section includes one or more elements.

The method 700 further includes tracking user interactions, or more specifically consumer interactions (like views or reads), with the documents at the document-element level for multiple users and reading sessions (action 706), and storing for each interaction an identifier of the respective document element (or of the section to which the element belongs), an identifier of the user, a time stamp or identifier of the particular reading session, and/or the duration of the interaction (action 708). For a given document, an "atomic consumption score" can be computed from this information for each user and reading session by measuring a duration of time spent on each of the sections (action 710), and then summing over the measured durations for the plurality of sections, each weighted by the weight assigned to the respective section (action 712). The time spent on each section may be determined, e.g., by calculating the difference between the time stamps associated with the first and last interactions of an uninterrupted series of interactions with elements of the section. Alternatively, if a duration associated with an interaction duration is stored for each interaction, the duration of time spent on a section can be computed by summing up the interaction durations of all interactions with elements of that section (within the reading session). The duration of an individual interaction, such as a read of a document element, may, for instance, be based on a time interval during which the user does not scroll through the document, but lingers at a certain position (though a minimum interaction frequency threshold may be applied to avoid counting times when the user is away from his computer as reading times). In some embodiments, the atomic consumption scores are computed only within specific time windows, which may be sliding windows, resulting in a time series of atomic consumption scores.

The session-specific atomic consumption scores may be aggregated over multiple sessions by a given user to compute a reader-specific consumption score for the document (action 714); this score may be taken as a high-quality quantitative indicator of the reader's interest in the document. Further, reader-specific consumption scores may be aggregated over all readers to compute a global consumption score for a document (action 716). In doing so, the reader-specific consumption scores may be weighted based on impact weights or other attributes associated with the respective readers.

Instead of aggregating across readers, it is also possible to compute atomic consumption scores for a single reader for multiple documents, and analyze the consumption scores across documents to identify a consumption pattern associated with the reader. This may serve to discover, for example, if a reader tends to thoroughly review documents or, instead, if he quickly jumps to certain portions (e.g., the conclusion), if a reader follows a lot of links to related content, etc. These reading behaviors, in turn, can help ascertain the readers' interest and adjust recommendations accordingly. For instance, a reader who shows the greatest interest in the results and conclusions of research may be presented preferentially with recent research-intense publications, whereas a reader who spends a lot of time in the background sections of publications may be shown a popular review article. In addition to using detected consumption patterns to assess what the individual user may be interested in, the patterns can also be used in the assessment of documents, e.g., to discriminate between hypes and continuous consumption of articles. Documents may also be classified in terms of reading trends, and the assignment to one of various reading trends may be based on the consumption patterns. Further, consumption patterns may be correlated with interaction scores computed for other types of interactions, such as citations, comments on documents, or posting of document reviews. Using the discovered correlations, invitations to review a document, suggestions to cite a document, etc. may be made based on a consumption pattern identified for a given document.

Figure 8:
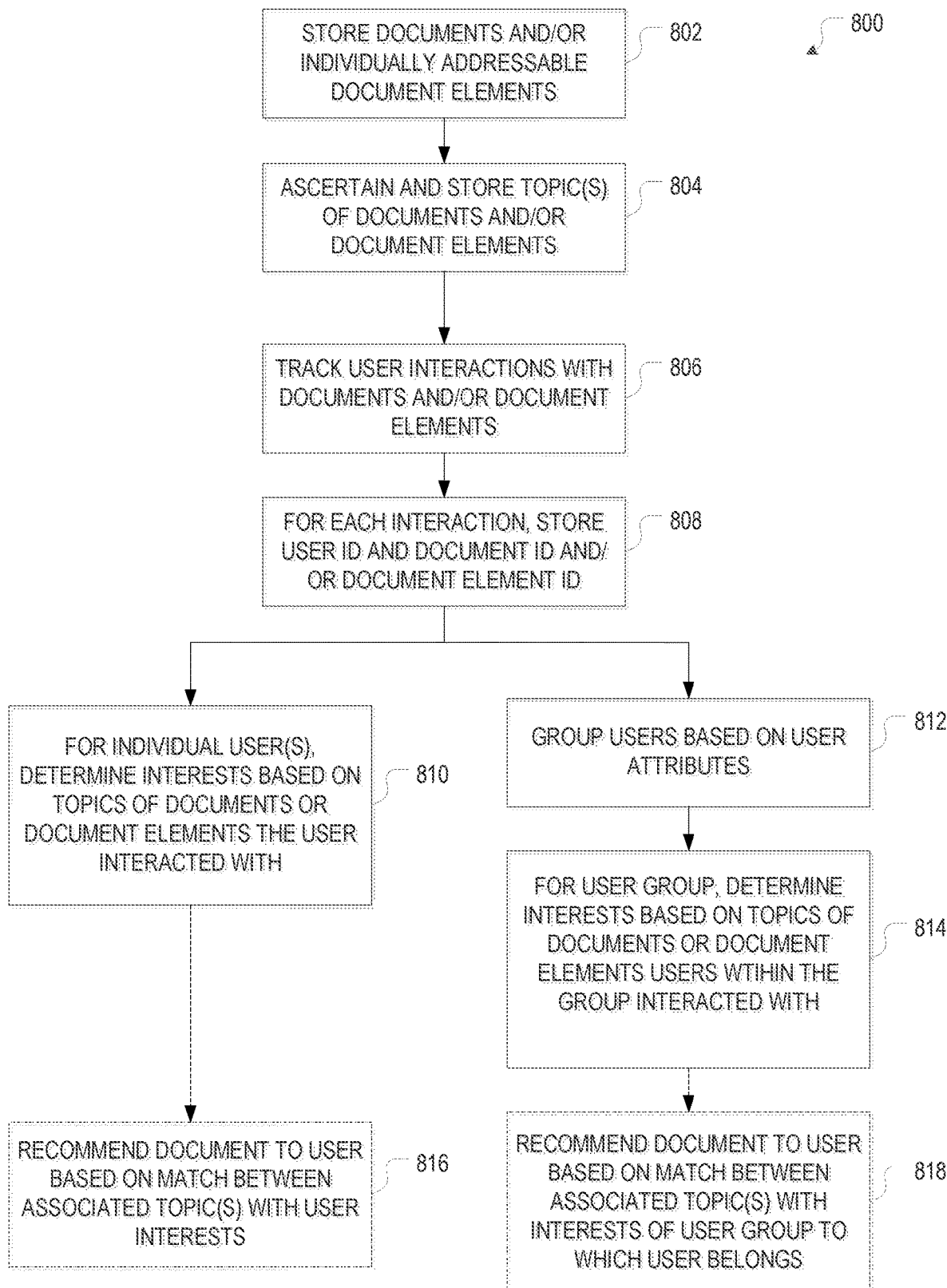
FIG. 8 is a flow chart of example methods for determining user interests based on tracked user interactions and making recommendations based thereon, in accordance with various embodiments.

FIG. 8 illustrates example methods 800, in accordance with various embodiments, for determining user interests based on tracked user interactions and making recommendations based thereon. In summary, the methods 800 generally involve storing documents and/or individually addressable document elements in an electronic data repository (action 802), ascertaining topics of the documents or document elements and storing the topics in association with the documents or document elements (action 804), tracking user interactions with the documents or document elements (action 806), storing identifiers of the interacting user and of the interacted-with document or document element for each interaction (action 808), and then determining user interests based on the tracked interactions in conjunction with the topics of the interacted-with documents or document elements (actions 810, 812, 814). The determined user interests may subsequently be used to make recommendations of documents to the users, based on matches with the topics of the documents and the user's interests (actions 816, 818).

In some embodiments, topics are determined and user interactions are tracked at the level of the documents. In other embodiments, topics are determined at sub-document level for individual document elements, which allows for a more refined determination of the user's interests, provided that the user interactions are tracked at the same (or an even finer) sub-document level. For example, if a user spends a significant amount of time reading the methods section of a research article, or even clicking on links embedded therein (e.g., links to products used in an experiment), a strong interest in methodology and experiments (perhaps indicative of a desire to reproduce the experiment) may be inferred, whereas a user spending more time on the introduction and/or conclusion may be assumed to be interested in general background information and/or the main insights provided by the published research. As another example, a user focusing his attention on multiple portions of the document that overlap in key terms, these key terms may be taken as good descriptors of the user's interests.

Regardless of whether a topic is ascertained for a document as a whole or a portion thereof (including one or possibly multiple individually addressable document elements, but generally fewer than all), the topics may be determined (in action 804) based on keywords extracted from the document or document element, as the case may be. In this context, keywords are terms that occur in a special-purpose dictionary that does not include, e.g., "stop words" (such as, e.g., common articles, conjunctions, or prepositions), and are therefore assumed to carry relevant meaning. Multiple different dictionaries can be created for, and used to identify keywords belonging to, different respective categories of keywords, such as for general scientific terms, product and/or vendor names, DNA sequences, or chemicals, to name but a few examples. Sometimes, a document or document element is run against multiple dictionaries to capture different aspects of the document or document element. Keyword extraction generally involves counting the number of occurrences, within the document or document element, of the words contained in the selected dictionary, and ranking the words based on these counts. The highest-ranking keywords may be taken to be the topics of the document or document-element. The number of topics associated with a document or document element may be capped by specifying the total number of highest-ranking keywords to be extracted, or limited based on a threshold corresponding to a minimum number of occurrences of a given keyword for it to be considered a topic. In some embodiments, a further refinement is implemented by supplementing the pool of extracted keywords with suggested keywords (e.g., related terms and/or synonyms) and looking for co-occurrences of certain terms. This renders it possible, e.g., to qualify or disambiguate keywords. For example, the keyword "depression" can denote very different things in different disciplines (e.g., in economics, geology, or clinical psychology), and co-occurrences with terms specific to one discipline or another can help identify what the keyword is intended to denote in the particular document. Accordingly, identifying topics may involves scoring co-occurrences between pairs of keywords.

Returning to the description of FIG. 8, user interest can be determined for individual users (action 810) or groups of users (actions 812, 814). To ascertain the interests of an individual user, the topics of the documents or document elements with which that particular user has interacted may identified and scored based, e.g., on the number of interactions for each topic. The highest-scoring topics may then be associated with the user as topics of interest. Alternatively or additionally, users may be grouped based on user attributes such as, e.g., seniority, discipline, geographic location, institutional affiliation, occupation (e.g., student vs. professor vs. industry researcher), or even reputation score (action 812), and user interactions and the respective topic counts may be aggregated across the users within a group to determine interests associated with the group as a whole (action 814). A user within the group is then deemed to "inherit" the interests of the group, regardless of his own personal interactions with the documents. Accordingly, for an individual user, recommendations can be made based on matches between document (element) topics with the individual user's interests (action 816) or with the interests of a user group to which the user belongs (action 818). As an example of the latter, a student may, for instance, receive recommendations for documents that other students within his field of study have read or otherwise interacted with. It is also possible, as yet another variation, to first cluster users based on overlap of the topics they interact with, and then determine which attributes (other than their related interests) these users share. In this manner, groups of users having similar interests may be discovered. It may turn out, for example, that many mathematicians happen to be interested in music.

In scoring topics based on the document or document elements a certain user or group of users has interacted with, different types of interactions may be weighted differently. For example, a document download may be weighted more than a mere view. Furthermore, the duration of an interaction may be taken into consideration, giving more weight to topics associated with documents or document elements the reader lingered on for a long time.

Moreover, while FIG. 8 and the above description refers specifically to user interests, other topic related user attributes may be determined based on the user's interaction. For example, while consumer interactions (e.g., reads, views, downloads) are generally indicative of interests, contributor interactions such as reviews of, comments on, or citations to documents may be taken as indicators of the interacting user's expertise related to the topics of the interacted-with documents or document elements.

Figure 9:
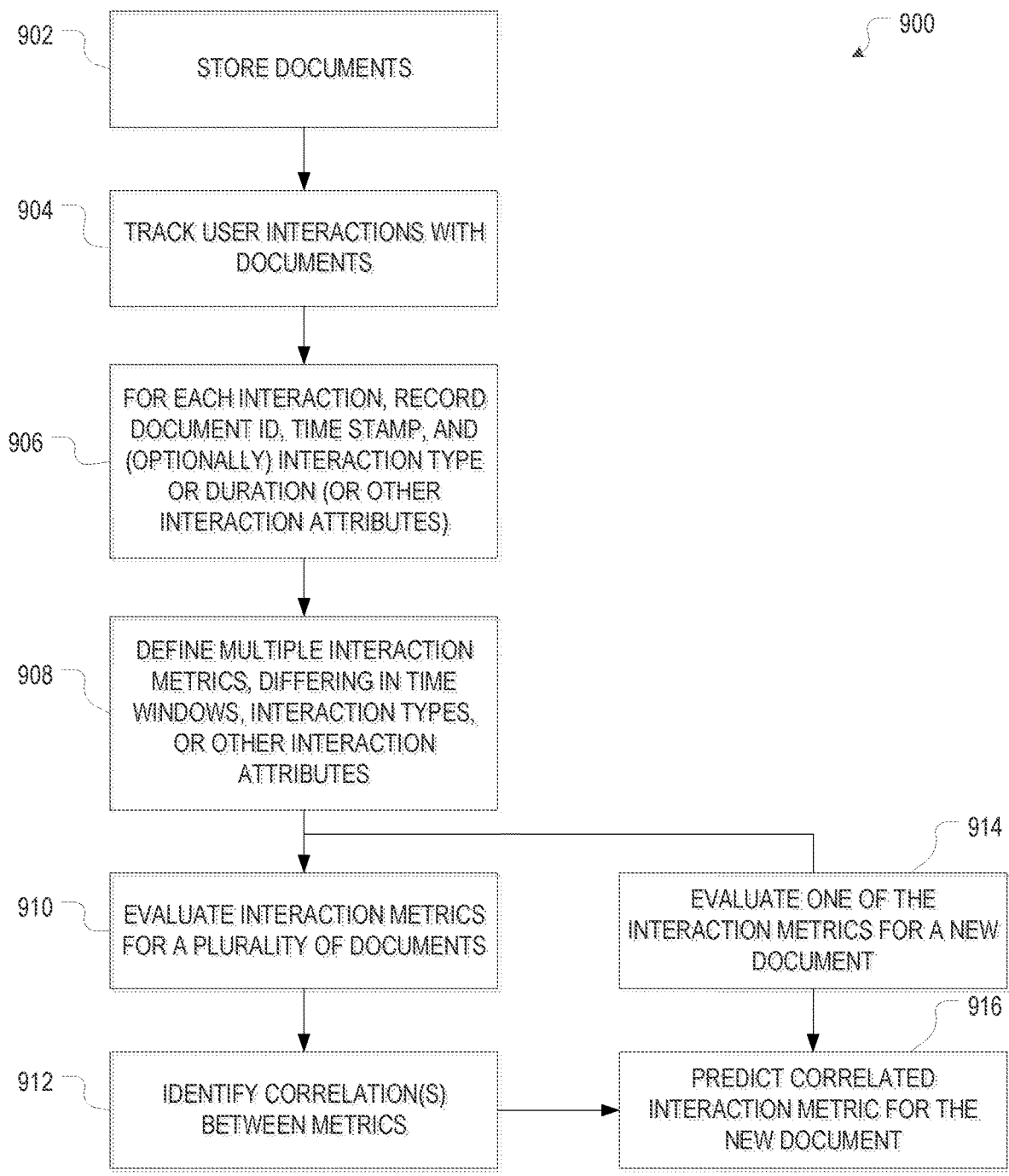
FIG. 9 is a flow chart of an example method for correlating user interaction metrics and making predictions based thereon, in accordance with various embodiments.

FIG. 9 illustrates an example method 900, in accordance with various embodiments, for correlating user interaction metrics across time, interaction types, and/or other dimensions to facilitate predictions about future user interactions. The method generally involves storing a plurality of documents (action 902), tracking user interactions with the documents (action 904), and recording, for each user interaction, an identifier of the interacted with document (that is, the object of the interaction) and one or more interaction parameters typically including a time stamp (that is, the time of the interaction), and optionally including, e.g., the interaction type, duration of interaction, etc. (action 906). Multiple interaction metrics that aggregate over various dimensions are then be defined (action 908) and evaluated for (a subset of) the plurality of documents (action 910). The interaction metrics may, for instance, include total interaction counts for many different time windows (e.g., daily, weekly, and/or monthly interaction counts), interaction counts limited to specific types of interactions (e.g., consumer interactions or citations), or interaction counts for certain groups of interacting users (e.g., students vs. academic researchers vs. researchers in commercial enterprises). Any of these counts may be weighted by interaction parameters. For instance, in total interaction counts, different types of interactions may be weighted differently, and in both total and interaction-type-specific counts, the duration of interaction (if applicable) may be used as a weight. Note that time windows used to define interaction metrics may differ in both their beginning time (this month vs. last month) and their temporal width (this week vs. this year). Thus, different time windows may, but need not, overlap.

Once computed for a large number of documents, the interaction metrics are analyzed to find correlations between them (action 912). To illustrate, it is, for instance conceivable that steady, moderate to high consumption rates for a document throughout the first year following its publication correlate highly with large numbers of citations to the document in the second to fourth years. Conversely, a document for which consumption rates spike to extraordinarily high levels within a few months and then decay rapidly may be indicative of a brief "hype" and result in very few citations of the document later on. To provide another example, it may turn out that research publications are initially read predominantly by academic users, thereafter by researchers in the industry, and last, if at all, by students. Correlations between interaction metrics may thus uncover common consumption and interaction patterns. To identify correlations between interaction metrics, any of a variety of mathematical techniques may be employed, including, e.g., principal component analysis, singular-value decomposition, product-moment correlation, regression, etc., or other methods well-known to those of ordinary skill in the art.

Apart from the study of interaction patterns in and of itself, the correlations may find application in the prediction of interaction metrics based on different, measured interaction metrics (action 916). Specifically, if a first one of the interaction metrics has been evaluated for a new document (which wasn't part of the set of documents used to identify correlations), a second interaction metric for the new document may be inferred from the first interaction metric in conjunction with the correlation. The first and second interaction metrics may differ by a specified time interval between the associated time windows. As will be appreciated by those of ordinary skill in the art, different interaction patterns and correlations may exist for different groups of documents. Accordingly, to identify meaningful correlations, comparisons between interaction metrics are limited, in accordance with one embodiment, to reference groups of documents share certain common characteristics (e.g., are relevant to the same discipline). Assuming that correlations have been identified for multiple reference groups of documents, predictions of interaction metrics and usage patterns for a given document are derived from correlations identified for the reference group of documents to which the given document belongs.

Figure 10:
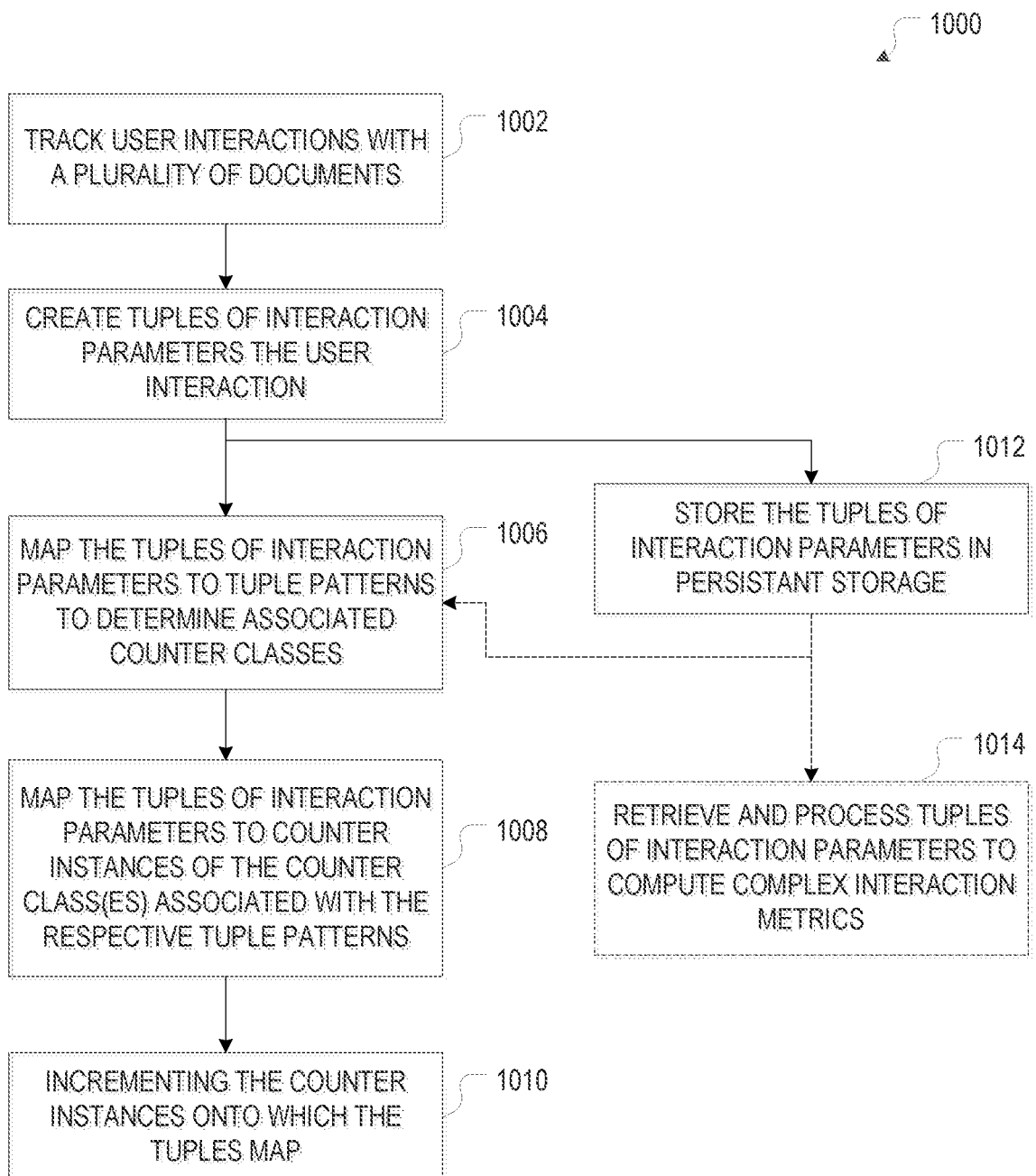
FIG. 10 illustrates an example method for updating interaction counters based on tracked user interactions, in accordance with various embodiments.

FIG. 10 illustrates an example method 1000 for updating interaction counters based on tracked user interactions, in accordance with various embodiments. The method 1000 involves tracking user interactions with a plurality of electronically stored documents (action 1002), and creating a tuple of interaction parameters for each tracked interaction (action 1004). In accordance with some embodiments, the tuple for interaction parameters includes at least an identifier of an actor performing the interaction, a type of interaction, an identifier of the document interacted with (and/or, for sub-document-level tracking, of the document element), and a time stamp. In some embodiments, at least some of the tuple further include an interaction target, such as an object (e.g., a publication, user profile, or product) referenced in the interacted-with document, or metadata indicating a context of the interaction.

The tuples of interaction parameters are mapped onto tuple patterns (e.g., as explained above with respect to FIG. 4) that each have one or more associated classes of interaction counters (action 1006). An interaction counter class is defined by reference to a tuple pattern and a combination of certain fields or sub-fields of the tuple. Thus, once the counter class(es) associated with a particular tuple of interaction parameters has or have been determined, the tuple can be mapped onto instances of the counter classes (action 1008) by substituting the fields or sub-fields by the respective values in the tuple. In some embodiments, these values, along with the pattern and time stamp (or a portion of the time stamp) are hashed to determine the key of the respective interaction counter instance (or simply "counter"). The counters associated with the tuple are then incremented (action 1010). In this manner, counters can be updated quickly, in many embodiments in real time (e.g., within less than a second of the underlying user interaction). In some embodiments, the counters are periodically reset (e.g., to zero), e.g., start the counts over at the beginning of every day, or at some other periodic intervals.

In addition to mapping the tuples of interaction parameters onto interaction counters and updating the counters, the tuples may also be stored in persistent data storage (action 1012), e.g., for the purpose of later re-processing (also referred to as "replay") to repair broken counters or to compute newly introduced counters retroactively. Alternatively or additionally, tuples may be retrieved from the persistent storage for the computation of interaction metrics that are too complex to be captured in terms of the interaction counters described above and/or that require the look-up of information not already included in the tuples (e.g., attributes of users that can be obtained from a database based on the user ID stored in the tuple, but are not themselves stored in the tuple).

In various embodiments, user-interaction metrics are published on the web site, individually in association with the documents to which they pertain and/or in an aggregate manner. For example, reading statistics for a document may be displayed in the form of a bar diagram in which the different sections of the document are set out along the abscissa, and, for each section, the percentage of readers of the document who viewed that particular section is depicted with a bar whose height and color code (or grey-scale value) corresponds to the percentage. The widths of the bars may encode the relative lengths of their corresponding sections.

Interaction statistics may also be aggregated in a summary page that lists the most clicked resources (e.g., images, citations, mark-ups, etc.) within a particular document, in accordance with one embodiment. Each of the listed resources may be displayed along with the portion of text (e.g., a specified number of characters) that precedes it and, thus, in the context in which it occurs in the document. The summary may include a hyperlink to each of the listed resources, allowing a user to go directly to the portion of the document that contains the listed resource. In some embodiments, a user, upon requesting access to a publication, is presented with a ranked list of the most cited resources, either by itself or along with metadata or beginning of the publication.

Reading statistics may also be overlaid onto a publication, in accordance with one embodiment. The document may be divided into multiple sections (generally tracking the native organization of the document into sections including, e.g., abstract, background, methods, etc., and possibly other sub-titled sections identifiable based on title formatting). These sections may be visually marked by tags overlaid onto the text (e.g., at the locations of the section titles). The tags may indicate the percentage of the document's readers that have read the particular section, e.g., using color or grey-scale coding or by displaying a numerical value. In alternative embodiments, the tag may show absolute numbers of readers (rather than percentages).

In some embodiments, tracked user interactions are clustered based one or more criteria, and interaction metrics are computed separately for the various clusters, to provide information on user interactions beyond merely giving a general picture of interactions by the user population at large. Clustering may, for instance, be based on the general sentiment of the interaction, as ascertainable from an analysis of, e.g., comments, citation context (more on that below), and/or up/down votes, to separately collect interaction data for supporters and critics of a given publication. This data may be presented, for example, in the form of two heat maps for the supporters and critics, respectively. In addition, one or more representative comments from each group may be displayed. The heat maps and/or representative comments give insights into which portions find approval and which draw critique. (Note that, in this context, a single feedback-providing user may act in one place of the publication as supporter and in another place as a critic. For example, a user may laud the quality of experimental data presented in the publication, but question its interpretation.) Other criteria for clustering feedback include the geographic region or field of research of the interacting users. Tracking and aggregating feedback separately for different user groups such as these may reveal, for instance, if a publication is more positively received in North America than in Europe, or identify which portions of a biophysics paper are more interesting to physicists and which more to biologists.

In some embodiments, a publication page includes a summary of consumption statistics for the publication. The consumption-statistics summary may be displayed along with the publication metadata alongside the authors, and may include the number of views, downloads, citations, feedback submissions, and followers for the publication. For comparison, averages for the same numbers across all publications within the same research discipline may also be displayed. In some embodiments, a navigation bar is displayed alongside a publication, depicting the publication sections. The navigation bar may include section labels whose spacing reflect the lengths of the various sections, giving the reader an instant view of the break-down of the publication. In addition to identifying the sections, the navigation bar may label sections that have received particularly high user-interaction levels (rendered visible within the sections, e.g., by symbols adjacent the publication that indicate comments or questions and optionally identify the users who posted them) as "most interesting." The sections and user-interaction-based labels may be clickable, allowing the user to jump to sections of the publication that are most interesting to her.

In some embodiments, user interactions are used to infer trends in searches for and consumption of publications, and these trends are then communicated to users. For example, consumption metrics such as the number of publication views or downloads may be computed at regular time intervals (and per interval), such as daily (or more often), weekly, or monthly. The currently most-viewed and/or most-downloaded publications (e.g., the top five publications, or publications exceeding a certain number of views/downloads in the last interval or a certain number of cumulative views/downloads since they were posted) may then be selected for display to users. The selection may be made separately for different research areas. For example, the top five (or some other number of) publications within a given research discipline may be incorporated into the publication pages for that discipline (e.g., shown in a separate box or area). Alternatively or additionally, a chart shown on a separate web page within the site may display metadata for and/or links to the top publications, broken down by research discipline.

Additionally or alternatively to aggregating reader statistics across all users, the system may, in some embodiments, analyze user interactions in conjunction with social data to derive statistics, e.g., as a function of social groups and status within the user network. For example, groups of users may be defined based on a combination of reputation (as measured, e.g., in terms of the user's impact score or a score computed within the social network itself), affiliation (e.g., with a university or company), location (e.g., geographic), seniority (e.g., as measured based on the time period spanned by the user's publications, the rank or position within an organization, the level of education, or the number of years of experience within a given field), and/or field of research or area of expertise. Interaction statistics may then be separately computed for the various groups, and may be published along with the documents, or circulated to interested parties via emails or similar notifications. In this manner, a user affiliated with a certain institution, for instance, may learn what his colleagues at the same institution are reading. As another example, a publication author may receive an overview of what groups of people are reading in his work. The author may be interested to find out, for example, whether his publication is read most by students, post-graduates, or professors (and perhaps, on occasion, a Nobel laureate); which fields of research his readers come from; or whether they are concentrated in certain geographic regions or at certain institutions.

In some embodiments, users of the social network and publication system 100 are presented at certain times with personalized and current content about relevant publications and network events related to their (real-world and/or online) social connections and affiliations. For example, users may receive personalized news feeds, delivered, e.g., by email or within a landing page upon logging into the system, that may inform them of new or trending publications within their respective areas of research or of milestones or specified performance levels reached by the publications of their close colleagues (an example of a "network event" as used herein). Such pertinent information may incent and enrich not only the use of the system 100, but also users' interactions with other people within their social network. For example, learning that a department colleague's publication has reached a certain milestone number of views may prompt a user to congratulate his colleague on the success of the paper.

Figure 11:
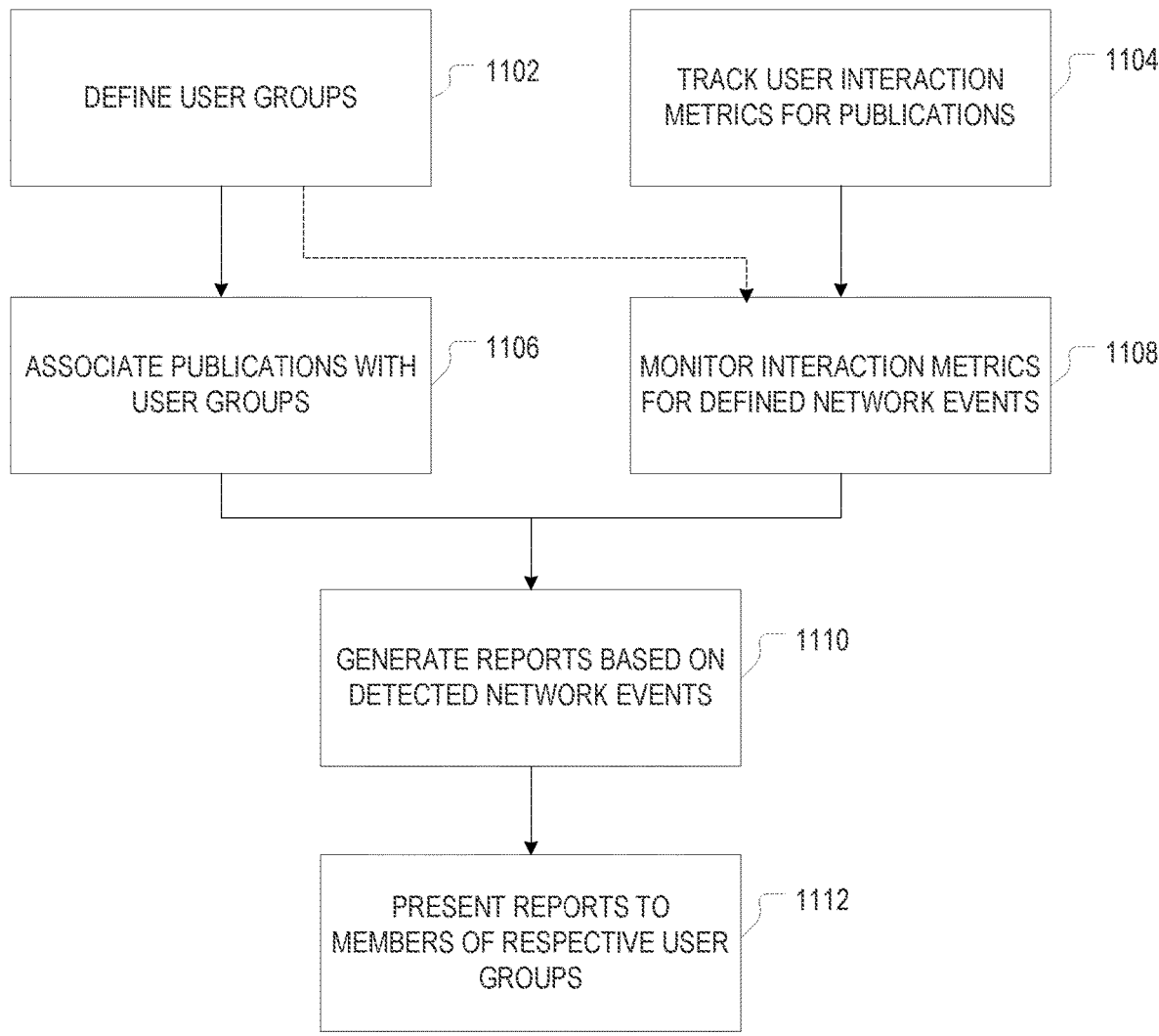
FIG. 11 is a flow chart of an example method for creating personalized reports on user interactions with online publications, in accordance with some embodiments.

FIG. 11 is a flow chart for a method 1100, in accordance with some embodiments, for creating personalized reports on user interactions with online publications. The method may be practiced within an online social network and publication system 100, and involves defining, at action 1102, (one or more) user groups within the network. A user group may, for instance, be formed of all users that are members of or affiliated with a certain institution (e.g., a university, research laboratory, or company) or department within an institution (e.g., the chemistry department of a university). User groups may also be defined based on co-authorship, e.g., such that all authors of a given publication (or, in some embodiments, a set of publications that have a certain specified overlap of authors) form a group. Depending on the criteria based on which user groups are defined, the groups may be disjoint (e.g., allowing only one institutional affiliation for each user for purposes of the grouping) or overlapping (as may be the case, e.g., with grouping based on co-authorship, where the same author may belong to multiple user groups).

The method 1100 further includes tracking user interactions and associated metrics for a plurality of publications (action 1104). In particular, in some embodiments, consumption metrics such as the number of views, downloads, and citations a publication has received are tracked. The publications are associated with the user group(s) of which their respective authors are members (action 1106). (Thus, the same publication may be associated with multiple user groups if its authors are members of different groups.) The user-interaction metrics are monitored, for individual publications and/or aggregated across publications for individual authors, for certain defined network events indicative of the reception of the publication (action 1108), and once such a network event has been detected, it is communicated to the group to which it pertains. For example, a network event may be registered when a given publication, or the collection of all publications (optionally within a given research area and/or time frame of publication dates) by a given author, reaches a specified milestone number (e.g., 100, 1000, etc.) of views/downloads/citations, or becomes the most viewed/downloaded/cited publication within the department, institution, country, or field of research, etc. in a given week.

These and other network events may trigger inclusion of associated interaction metrics and/or indications of the network events into reports generated, at action 1110, for respective user groups with whose publications the network events are associated. In some embodiments, reports (e.g., news feeds) are generated for the various user groups at regular, pre-scheduled intervals, and include information on whatever defined network events may have occurred in the last interval. In other embodiments, reports are generated directly in response to the network events. In some embodiments, the reports are precomputed and stored for retrieval and presentation to users (at action 1112) automatically upon login, or upon request (as may be made by the user, e.g., in response to an email notification of a newly available report). To provide some specific examples of the type of information communicated: a report may inform the users within a given department when a department colleague, or a department colleague's publication, has reached X number of views/downloads/citations Y number of days ago, or had the most views/downloads/citations among the publications authored within the department, institution, country, or research area last week, or in some other relevant time frame. Similarly, when a certain publication has reached a milestone number of views/downloads/citations or was the most viewed/downloaded/cited publication(s) at some point, this network event may be communicated not only to the authors, but also to their co-authors on other publications, and when a particular author's publications have reached such a defined milestone or performance level in the aggregate, this may be reported to his co-authors (on any of the publications). As will be readily understood by those of ordinary skill in the art, some network events (such as a publication reaching a certain milestone number of views/downloads/citations) may be defined independently of the user-group definitions, whereas others (such as a publication being the most viewed/downloaded/cited among the publications associated with a department) may be defined with reference to a particular user group.

Certain embodiments are described herein as including a number of logic components or modules. Modules may constitute either software modules (e.g., code embodied on a non-transitory machine-readable medium) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 12:
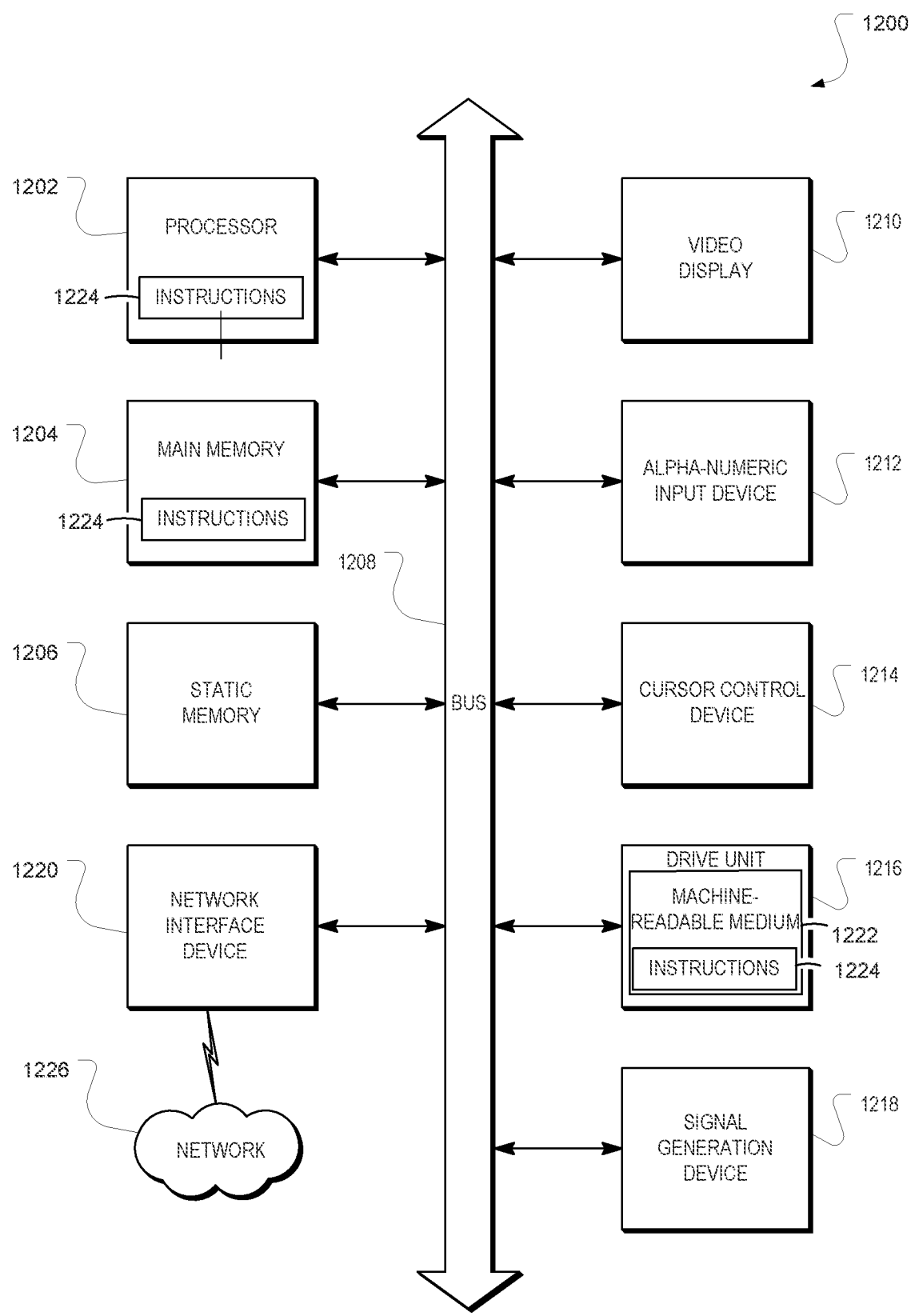
FIG. 12 is a block diagram of a machine in the example form of a computer system 300 within which instructions for causing the machine to perform any one or more of the methodologies discussed herein may be executed.

FIG. 12 is a block diagram of a machine in the example form of a computer system 700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server in server-client network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker) and a network interface device 1220.

The disk drive unit 1216 includes a machine-readable medium 1222 storing one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories and optical and magnetic media. Specific examples of machine-readable media include hardware data storage devices such as: non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The following numbered examples are illustrative embodiments.

1. A method comprising: in an electronic data repository, storing individually addressable document elements for a plurality of documents, each document element having an associated weight; and, using one or more computer processors, tracking user interactions with the document elements, and, based at least in part on the tracked user interactions weighted at least by the weights associated with the respective document elements, computing scores associated with at least one of the documents, authors of the documents, users interacting with the document elements, objects cited in the document elements, or topics associated with the documents or document elements.

2. The method of example 1, wherein each of the document elements belongs to one of multiple specified types of document portions having respective associated weights, the weight associated with each document element being the weight associated with the type of document portion to which the document element belongs.

3. The method of example 2, wherein the document portions correspond to sub-titled section of the documents.

4. The method of any one of examples 1-3, wherein tracking user interactions comprises determining one or more interaction parameters for each user interaction in addition to the document element interacted with, and wherein the user interactions are further weighted, in computing the scores, based on at least one of the additional interaction parameters.

5. The method of example 4, wherein the one or more interaction parameters comprise at least one of an identifier or attribute of the interacting user, a type of interaction, a time of interaction, or a duration of interaction.

6. The method of any one of examples 1-5, wherein the scores comprise impact scores associated with the documents.

7. The method of any one of examples 1-6, wherein the scores comprise reputation scores associated with authors of the documents.

8. The method of any one of examples 1-7, wherein the scores comprise user activity scores associated with interacting users.

9. The method of any one of examples 1-8, wherein the scores comprise scores associated with objects cited in the documents.

10. The method of any one of examples 1-9, wherein the scores comprise interest scores associated with topics of the documents.

11. The method of any one of examples 1-10, wherein the scores comprise relatedness scores associated with two users or two documents.

12. The method of any one of examples 1-11, further comprising computing one or more interaction metrics for the document elements based on the tracked user interactions, and wherein the score is computed based on the one or more interaction metrics.

13. A system comprising: one or more processors, and one or more memories storing instructions for controlling the one or more processors to carry out the method of any one of examples 1-12.

14. A carrier medium carrying instructions for controlling one or more processors to carry out the method of any one of examples 1-12.

15. A method comprising: using one or more computer processors, tracking online user interactions with a plurality of online documents and storing, for each of the interactions, a plurality of associated interaction parameters comprising at least an identifier of the document interacted with and an identifier of the interacting user; and, for each of the plurality of documents, computing an impact score associated with the document based on a weighted count of the interactions with the document, each interaction in the count being weighted based at least in part on an attribute of the interacting user.

16. The method of example 15, wherein the interaction parameters further comprise a time of the interaction, the impact score being based only on interactions having an associated time of interaction within a specified time window.

17. The method of example 16, wherein the impact scores for the plurality of documents are computed periodically.

18. The method of example 17, wherein each computation of the impact score is based on interactions having an associated time of interaction within a time window specified relative to a time of the computation.

19. The method of any one of examples 15-18, wherein the interaction parameters further comprise a duration of the interaction, each interaction in the count further being weighted based in part on the duration of the interaction.

20. The method of any one of examples 15-19, wherein the interaction parameters further comprise a type of interaction, each interaction in the count further being weighted based in part on the type of the interaction.

21. The method of any one of examples 15-20, wherein at least some of the documents each comprises multiple document elements, the interaction parameters further comprising an identifier of the document element interacted with, each interaction in the count further being weighted based in part on the document element.

22. The method of any one of examples 15-21, wherein each interaction in the count is weighted based at least in part on a reputation of the interacting user, an expertise of the interacting user in a discipline associated with the document, or a seniority of the interacting user.

23. The method of any one of examples 15-22, wherein each interaction in the count is weighted based at least in part on whether the interacting user is an author of the document.

24. The method of example 23, wherein a weight associated with an interaction by an author of the document is zero.

25. The method of any one of examples 15-24, wherein each interaction in the count is weighted based at least in part on whether the interacting user and an author of the document have a common affiliation.

26. The method of any one of examples 15-25, wherein a weight associated with interactions by robots is zero.

27. The method of any one of examples 15-26, further comprising detecting repeated interactions with a document by the same user or group of users and, if the repeated interactions exceed a specified threshold, associating a weight of zero with interactions by that user or group of users with the document.

28. The method of any one of examples 15-27, wherein the impact score is specific to a specified user group and computed based only on interactions having an associated interacting user within the user group.

29. The method of example 28, further comprising computing multiple impact scores specific to multiple respective specified user groups.

30. The method of any one of examples 15-29, further comprising defining one or more reference groups of documents and comparing impact scores of documents only within each of the one or more reference groups.

31. The method of example 30, wherein the reference groups are based on at least one of disciplines or sub-disciplines, author seniority, funding sources, countries, or publication dates associated with the documents.

32. The method of any one of examples 15-31, further comprising computing, for each of the plurality of documents, multiple impact scores associated with the document based on weighted interaction counts, different ones of the impact scores differing in at least one of respective specified time windows or respective weightings of the interactions in the count, and analyzing the multiple impact scores to identify correlations therebetween.

33. A system comprising: one or more processors, and one or more memories storing instructions for controlling the one or more processors to carry out the method of any one of examples 15-32.

34. A carrier medium carrying instructions for controlling one or more processors to carry out the method of any one of examples 15-32.

35. A method for measuring document consumption, the method comprising: dividing a document into a plurality of sections and assigning a weight to each of the sections; and, for at least one reading session by at least one reader, computing an atomic consumption score by measuring a duration of time spent on each of the sections and summing over the measured durations for the plurality of sections, each weighted by the weight assigned to the respective section.

36. The method of example 35, further comprising aggregating over the atomic consumption scores computed for multiple reading sessions of a single reader to compute a reader-specific consumption score for the document.

37. The method of example 36, further comprising aggregating over the reader-specific consumption scores computed for multiple users to compute a global consumption score for the document.

38. The method of example 37, further comprising, weighting the reader-specific consumption scores by impact weights associated with the respective readers.

39. The method of any one of examples 35-38, wherein the atomic consumption scores are aggregated only over a specified time period.

40. The method of example 39 wherein the specified time period is a sliding window.

41. The method of any one of examples 35-40, further comprising performing the acts of dividing the document into sections and computing atomic consumption scores for the document for a plurality of documents and analyzing the atomic consumptions scores across documents to identify consumption patterns.

42. The method of example 41, wherein the consumption patterns discriminate between hypes and continuous consumption.

43. The method of example 41, further comprising tracking interactions with the documents and correlating interaction scores computed based on the tracked interactions with the detected consumption patterns.

44. The method of example 43, wherein the tracked interactions comprise at least one of citations of the documents or posting of reviews of the documents or comment on the documents.

45. The method of example 41, further comprising assigning documents to reading trends based at least in part on the consumption patterns.

46. A system comprising: one or more processors, and one or more memories storing instructions for controlling the one or more processors to carry out the method of any one of examples 35-45.

47. A carrier medium carrying instructions for controlling one or more processors to carry out the method of any one of examples 35-45.

48. A method comprising: in an electronic data repository, storing individually addressable document elements for a plurality of documents, each of at least some of the document elements having one or more associated topics; and, using one or more computer processors, tracking user interactions with the document elements and storing, for each of the interactions, at least an identifier of the document element interacted with and an identifier of the interacting user, and determining, for each of at least some of the interacting users, at least one of an interest or a field of expertise based at least in part on the tracked user interactions of that user and the topics associated with the interacted-with document elements.

49. The method of example 48, wherein interests of the interacting users are determined based at least in part on consumer interactions of the respective users.

50. The method of example 48 or 49, wherein fields of expertise of the interacting users are determined based at least in part on contributor interactions of the respective users.

51. The method of any one of examples 48-50, further comprising, using the one or more computer processors, generating, for at least one of the interacting users, a recommendation of one or more documents to the user based on a match between topics associated with the one or more documents and the interest or field of expertise of the user.

52. The method of any one of examples 48-51, further comprising, using the one or more computer processors, grouping users based on user attributes to define one or more user groups, and determining interests of the one or more user groups based at least in part on the tracked user interactions of users belonging to the respective user group and the topics associated with the interacted-with document elements.

53. The method of example 52, wherein the user attributes comprise at least one of a research discipline, a geographic region, an institutional affiliation, an occupation, a seniority, or a reputation score associated with the respective user.

54. The method of example 52 or example 53, further comprising, using the one or more computer processors, generating, for one or more of the users, a recommendation of one or more documents based on a match between topics associated with the one or more documents and the interest determined for the user group to which the user belongs.

55. The method of any one of examples 48-55, further comprising further storing, for each of the interactions, at least one of a duration of interaction or a type of interaction, and weighting different types of interaction or different durations of interaction differently in determining the interest or fields of expertise of the at least some of the interacting users.

56. A system comprising: one or more processors, and one or more memories storing instructions for controlling the one or more processors to carry out the method of any one of examples 48-55.

57. A carrier medium carrying instructions for controlling one or more processors to carry out the method of any one of examples 48-55.

58. A method comprising: using one or more computer processors, tracking user interactions with a plurality of electronically stored documents and recording, for each of the interactions, at least an identifier of the document interacted with and one or more interaction attributes comprising at least a time of interaction; for each of a subset of the plurality of documents, computing a plurality of interaction metrics associated with the document based on a respective plurality of counts of the interactions with the document having times of interactions within different respective time windows; analyzing the plurality of interaction metrics to identify a correlation therebetween; and, for at least one document not within the subset, computing a first interaction metric based on a count of the interactions with the document within a first time window and, based on the first interaction metric and the correlation, predicting a second interaction metric for a second time window.

59. The method of example 58, wherein the interaction attributes further include at least one of a type of interaction, a duration of interaction, or information about an interacting user.

60. The method of example 58 or example 59, wherein, in determining the counts of the interactions to compute the interaction metrics, the interactions are weighted based on the interaction attributes.

61. The method of any one of examples 58-60, wherein at least some of the plurality of interaction metrics differ in the weights assigned to different types of interactions.

62. The method of any one of examples 58-61, wherein the first and second interaction metrics differ by a specified time interval between the first and second time windows.

63. The method of example 62, wherein the first and second interaction metrics further differ by weights assigned to different types of interactions.

64. The method of any one of examples 58-63, wherein the correlation is identified based on analyzing the plurality of interaction metrics computed from interactions within a reference group of documents, the second interaction metric being predicted for a document within the same reference group.

65. A system comprising: one or more processors, and one or more memories storing instructions for controlling the one or more processors to carry out the method of any one of examples 58-64.

66. A carrier medium carrying instructions for controlling one or more processors to carry out the method of any one of examples 58-64.

67. A method comprising: using one or more computer processors, tracking user interactions with a plurality of electronically stored documents by creating, for each of the interactions, a tuple of associated interaction parameters comprising at least an identifier of an actor performing the interaction, a type of interaction, an identifier of the document interacted with, and a time stamp; and, in response to each tracked user interaction, mapping the respective associated tuple of interaction parameters to one of a plurality of tuple patterns, each tuple pattern having one or more interaction counter classes associated therewith, mapping the tuple of interaction parameters to counter instances of the one or more interaction counter classes associated with the tuple pattern, and incrementing all counter instances onto which the tuple of interaction parameters maps.

68. The method of example 67, wherein the counter instances are incremented in real time.

69. The method of example 68, wherein the counter instances are reset periodically.

70. The method of any one of examples 67-69, further comprising recording the tuples of interaction parameters for the tracked user interactions in persistent data storage.

71. The method of example 70, further comprising re-processing the recorded tuples of interaction parameters to re-compute the associated counter instances.

72. The method of example 70 or example 71, further comprising re-processing the recorded tuples of interaction parameters to compute counter instances of one or more newly defined counter classes.

73. The method of any one of examples 67-72, further comprising retrieving at least some of the recorded tuples of interaction parameters from the permanent storage and computing one or more complex interaction metrics based thereon.

74. The method of any one of examples 67-73, further comprising temporarily storing the tuples of interaction parameters associated with the tracked user interactions in a queue, and asynchronously retrieving the temporarily stored tuples from the queue for subsequent mapping onto counter instances.

75. The method of any one of examples 67-74, wherein at least some of the created tuples of interaction parameters further comprise at least one of a target of the interaction or metadata indicating a context of the interaction.

76. A system comprising: one or more processors, and one or more memories storing instructions for controlling the one or more processors to carry out the method of any one of examples 67-75.

77. A carrier medium carrying instructions for controlling one or more processors to carry out the method of any one of examples 67-75.

78. A method for tracking user interactions with documents published online, the method comprising: in an electronic data repository, storing each of a plurality of documents as a plurality of individually addressable document elements that collectively define the contents of the document; during display of a document on a client device, tracking user interactions with the document elements of that document; based on the tracked user interactions, computing one or more interaction metrics for the individual document elements or for document portions each comprising one or more document elements; and textually or graphically displaying the one or more computed interaction metrics.

79. The method of example 78, wherein the document elements are sub-titled document sections.

80. The method of example 78 or example 79, wherein the document elements are visually delimited.

81. The method of any one of examples 78-80, wherein the tracked user interactions comprise at least one of a view, a read, a scroll-through, a download, a selection, a mark-up, a citation, or an annotation.

82. The method of example 81, wherein the tracked user interactions comprise at least one selection comprising a click, a transient highlight, or a copy-and-paste.

83. The method of any one of examples 78-82, wherein tracking user interactions with the document elements comprises tracking an indirect user interaction with a first document element based on a direct user interaction with a second document element referencing the first document element.

84. The method of any one of examples 78-83, wherein the one or more interactions metrics comprise one or more counts of user interactions.

85. The method of any one of examples 78-84, wherein the one or more counts are categorized by at least one of a type of user interaction or a parameter associated with the interacting user.

86. The method of any one of examples 78-85, wherein the one or more interaction metrics comprise one or more weighted counts of user interactions, the weights being based on at least one of a type of user interaction or a parameter associated with the interacting user.

87. The method of any one of examples 78-86, wherein displaying the one or more interaction metrics comprises displaying a map for one of the documents, the map comprising regions corresponding to the elements of the document, each region visually encoding a value of the one or more interaction metrics.

88. The method of example 87, wherein displaying the map comprises overlaying the map onto a rendition of the document.

89. The method of any one of examples 78-88, further comprising, adjusting rendition of the documents based on the one or more interaction metrics computed for their respective document elements.

90. The method of example 89, wherein the adjusting comprises displaying, upon a user request for access to a document, a most-read or most-viewed element of the document.

91. The method of example 89, wherein the adjusting comprises rendering the document elements in an order depending on relative user-interaction levels associated with the document elements.

92. The method of any one of examples 78-91, wherein the one or more computed user interaction metrics are tracked as a function of time.

93. The method of any one of examples 78-92, further comprising identifying topics associated with the document elements, and propagating the computed user interaction metrics to the topics associated therewith.

94. The method of any one of examples 78-93, wherein tracking the user interactions comprises storing the user interactions on the client device and, upon connection of the client device with a server that caused display of the document, communicating the stored user interactions to the server.

95. A system for tracking user interactions with documents published online, the system comprising: an electronic data repository storing each of a plurality of documents as a plurality of individually addressable document elements that collectively define the contents of the document; a processor-implemented page-creator module configured to create, based at least in part on the document elements, a web page for transmission to a client device and display thereat, the web page comprising a representation of the document elements and instructions causing the client device to track user interactions with the document elements; a processor-implemented interaction-processing module configured to compute, based on the tracked user interactions, one or more interaction metrics for the individual document elements or for document portions each comprising one or more document elements, wherein the page-creator module is further configured to update the web page with a textual or graphic representation of the computed interaction metrics.

96. A method comprising: within an online social network, defining a plurality of user groups; tracking user interaction metrics for a plurality of publications; associating with each of the user groups publications, from among the plurality of publications, that were authored by a member of the user group; and generating publication reports for the user groups, each publication report comprising interaction metrics or information derived therefrom for one or more of the publications associated with the respective group.

97. The method of example 96, wherein the user groups are defined at least in part based on institutional affiliations.

98. The method of example 96 or example 97, wherein the user groups are defined at least in part based on co-authorship of publications.

99. The method of any one of examples 96-98, wherein the tracked user interaction metrics comprise at least one of publication views, downloads, or citations.

100. The method of any one of examples 96-99, wherein generating the publication reports comprises monitoring the user interaction metrics for the plurality of publications for specified network events, and including user interaction metrics into the reports for their respective associated user groups when the network events occur.

101. The method of any one of examples 96-100, wherein the user interaction metrics comprise metrics aggregated across publications having a common author.

102. A method comprising: within an online social network and publication system, periodically compute user consumption metrics for a plurality of publications; based on the computed consumption metrics, select trending publications for one or more fields of publication; and display the selected trending publications to users of the online social network and publication system.

103. The method of example 102, wherein the consumption metrics include at least one of publication views, publication downloads, or searches for publications.

104. The method of example 102, wherein the consumption metrics are computed at least daily.

105. A method comprising: storing a document in a data repository as a plurality of individually addressable document elements that collectively define the contents of the document; during a first user session during which the document is accessed by a user, tracking user interactions with the document at a document-element level; upon a request by the user for access to the document during a second user session, automatically directing the user to the document element that was last viewed during the first user session.

106. A method comprising: for each of a plurality of documents of a first type, extracting one or more document elements from the document; identifying locations of the one or more extracted document elements within the document; and storing the one or more extracted document elements as individually addressable elements along with their respective locations in a database in association with the document; and, upon a user request for access to one of the documents of the first type, displaying the requested document and, overlaid thereon, rendering at least one of the extracted document elements.

107. The method of example 106, wherein rendering at least one of the extracted document elements comprises providing functionality for user interaction with the at least one of the at least one extracted document element.

108. The method of example 106 or example 107, wherein the extracted document elements comprise at least one of figures or citations, the figures or citations being clickable.

109. The method of any one of examples 106-108, wherein the documents of the first type are pdf documents.

110. The method of any one of examples 106-109, further comprising: for each of a plurality of document of a second type, analyze contents of the document to identifying a plurality of document elements that collectively constitute the contents; determine an order of the document elements within the document; and store the plurality of document elements and their order within the document in a database in association with the document; and, upon a user request for access to one of the documents of the second type, displaying the document elements constituting the requested document.

Although the invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

What is claimed is:

1. A method comprising:
    serving a web site providing access to a plurality of electronically stored documents;
    tracking user interactions with the documents and electronically storing, for each of the interactions, a plurality of interaction parameters comprising at least an identifier of the document interacted with, a type of interaction, and a duration of interaction;
    computing, with one or more computer processors, document-specific impact scores for the documents by aggregating, for each document, interactions with that document across multiple interacting users into a weighted count of interactions, each interaction in the count being weighted based at least in part on the type of interaction and at least some of the interactions in the count being weighted further based on the duration of interaction; and
    electronically communicating the impact scores to at least some of the users.

2. The method of claim 1, wherein electronically communicating the impact scores comprises publishing the impact scores along with the documents on the web site.

3. The method of claim 1, wherein electronically communicating the impact scores comprises sending the impact scores to individual users or groups of users in electronic notifications.

4. The method of claim 3, wherein the notifications are sent, triggered by milestones reached by publications, to at least one of the respective authors of the publications or the respective authors' colleagues.

5. The method of claim 1, wherein the operations further comprise:
    aggregating the impact scores over documents by a given author to determine an author-specific reputation score.

6. The method of claim 1, wherein the types of interactions associated with the user interactions with the documents comprise at least one of views, reads, downloads, scroll-throughs, follows, copy-and-pastes, clicks, highlights, mark-ups, annotations, citations, or comments.

7. The method of claim 1, wherein weighting of interaction types in the weighted count reflect respective levels of engagement within a hierarchy of interaction types.

8. The method of claim 1, wherein the interaction parameters further comprise identifiers of the interacting users performing the interactions, the interactions within the count for each document being weighted based further on attributes of the interacting users.

9. The method of claim 1, wherein the interaction parameters further comprise a time stamp, the interactions being aggregated over a time window specified relative to a time of computation of the document-specific impact scores.

10. The method of claim 1, further comprising tracking how interaction metrics evolve as a function of time to evaluate correlations between user interactions with a publication and author-provided modifications to the publication.

11. The method of claim 1, further comprising:
    computing separate interaction counts for different types of interaction as a function of time; and
    finding mathematical correlations between an interaction count of one type of interaction at a first time and an interaction count of another, different type of interaction at a second time to discover consumption patterns.

12. The method of claim 11, further comprising:
    making, based on the correlations, at least one of predictions of future interactions, invitations to a review a document, or suggestions to cite a document.

13. The method of claim 1, wherein the documents are research articles, the method further comprising:
    forming reference groups of subsets of the plurality of documents based on at least one of research discipline, funding source, country, publication date, or author seniority; and
    ranking the documents within the reference groups based on the computed impact scores.

14. A system comprising:
    one or more computer processors operatively to execute instructions stored in one or more machine-readable media to implement a plurality of components comprising:
    a front-end subsystem configured to serve web content providing access to a plurality of electronically stored documents, and to track user interactions with the documents, each of the interactions having an associated set of interaction parameters comprising at least an identifier of the document interacted with, a type of interaction, and a duration of interaction; and
    an interaction processing subsystem configured to compute document-specific impact scores for the documents by aggregating, for each document, interactions with that document across multiple interacting users into a weighted count of interactions, each interaction in the count being weighted based at least in part on the type of interaction and at least some of the interactions in the count being weighted further based on the duration of interaction, the interaction processing system further to send the impact scores to the front-end subsystem for inclusion in the web content.

15. The system of claim 14, wherein the web content comprises Java script or HTML forms configured for user-interaction tracking.

16. The system of claim 14, wherein the interaction processing subsystem is further configured to aggregate the impact scores over documents by a given author to determine an author-specific reputation score.

17. The system of claim 14, wherein weighting of interaction types in the weighted count reflect respective levels of engagement within a hierarchy of interaction types.

18. The system of claim 14, wherein the front-end subsystem is further configured to send the impact scores to individual users or groups of users in electronic notifications.

19. The system of claim 14, wherein the interaction parameters further comprise a time stamp, the interactions being aggregated over a time window specified relative to a time of computation of the document-specific impact scores.

20. One or more machine-readable hardware storage devices storing instructions for execution by one or more processors, the instructions, when executed, causing the one or more processors to perform operations comprising:
- serving a web site providing access to a plurality of electronically stored documents;
- tracking user interactions with the documents and electronically storing, for each of the interactions, a plurality of interaction parameters comprising at least an identifier of the document interacted with, a type of interaction, and a duration of interaction;
- computing, with one or more computer processors, document-specific impact scores for the documents by aggregating, for each document, interactions with that document across multiple interacting users into a weighted count of interactions, each interaction in the count being weighted based at least in part on the type of interaction and at least some of the interactions in the count being weighted further based on the duration of interaction; and
- electronically communicating impact scores to at least some of the users.

\* \* \* \* \*